US010970645B1

(12) United States Patent
 Kim et al.

(10) Patent No.: US 10,970,645 B1
(45) Date of Patent: Apr. 6, 2021

(54) METHOD FOR EXPLAINABLE ACTIVE LEARNING, TO BE USED FOR OBJECT DETECTOR, BY USING BAYESIAN DUAL AUTOENCODER AND ACTIVE LEARNING DEVICE USING THE SAME

(71) Applicant: Stradvision, Inc., Pohang-si (KR)

(72) Inventors: Kye-Hyeon Kim, Seoul (KR); Sung An Gweon, Seoul (KR); Yongjoong Kim, Pohang-si (KR); Bongnam Kang, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 17/135,033

(22) Filed: Dec. 28, 2020

Related U.S. Application Data

(60) Provisional application No. 63/021,809, filed on May 8, 2020.

(51) Int. Cl.
 *G06N 7/00* (2006.01)
 *G06N 20/00* (2019.01)
 *G06K 9/00* (2006.01)
 *G06T 7/174* (2017.01)
 *G06T 7/11* (2017.01)

(52) U.S. Cl.
 CPC ......... *G06N 7/005* (2013.01); *G06K 9/00201* (2013.01); *G06N 20/00* (2019.01); *G06T 7/11* (2017.01); *G06T 7/174* (2017.01); *G06T 2207/20076* (2013.01); *G06T 2207/20081* (2013.01); *G06T 2207/20132* (2013.01)

(58) Field of Classification Search
 CPC . G06T 2207/20132; G06T 2207/20081; G06T 2207/20076; G06T 7/174; G06T 7/11; G06K 9/00201; G06N 20/00; G06N 7/005
 See application file for complete search history.

(56) References Cited

U.S. PATENT DOCUMENTS

| | | | | |
|---|---|---|---|---|
| 7,720,257 | B2 * | 5/2010 | Morellas | G06T 7/246 382/103 |
| 10,783,632 | B2 * | 9/2020 | Fan | G16H 50/20 |
| 2016/0350930 | A1 * | 12/2016 | Lin | G06K 9/66 |
| 2019/0304067 | A1 * | 10/2019 | Vogels | G06F 17/18 |
| 2020/0160709 | A1 * | 5/2020 | Ramot | G06Q 10/109 |
| 2020/0242763 | A1 * | 7/2020 | Bhuiyan | G06T 7/12 |

(Continued)

*Primary Examiner* — Mia M Thomas
(74) *Attorney, Agent, or Firm* — Kaplan Breyer Schwarz, LLP

(57) ABSTRACT

Processes of explainable active learning, for an object detector, by using a Bayesian dual encoder is provided. The processes include: (a) inputting test images into the object detector to generate cropped images, resizing the test images and the cropped images, and inputting the resized images into a data encoder to output data codes; (b) (b1) one of (i) inputting the test images into the object detector, applying Bayesian output embedding and resizing the activation entropy maps and the cropped activation entropy maps, and (ii) inputting resized object images and applying the Bayesian output embedding and (b2) inputting the resized activation entropy maps into a model encoder to output model codes; and (c) (i) confirming reference data codes, selecting specific test images as rare samples, and updating the data codebook, and (ii) confirming reference model codes and selecting specific test images as hard samples.

20 Claims, 9 Drawing Sheets

(56) References Cited

U.S. PATENT DOCUMENTS

| | | | |
|---|---|---|---|
| 2020/0268260 A1* | 8/2020 | Tran | A61B 5/0538 |
| 2020/0285976 A1* | 9/2020 | Srikantha | G06K 9/6217 |
| 2020/0326667 A1* | 10/2020 | Ahuja | G06N 5/046 |
| 2020/0342637 A1* | 10/2020 | Zhang | G06T 7/0012 |
| 2020/0410259 A1* | 12/2020 | Srinivasan | G06T 7/50 |

* cited by examiner

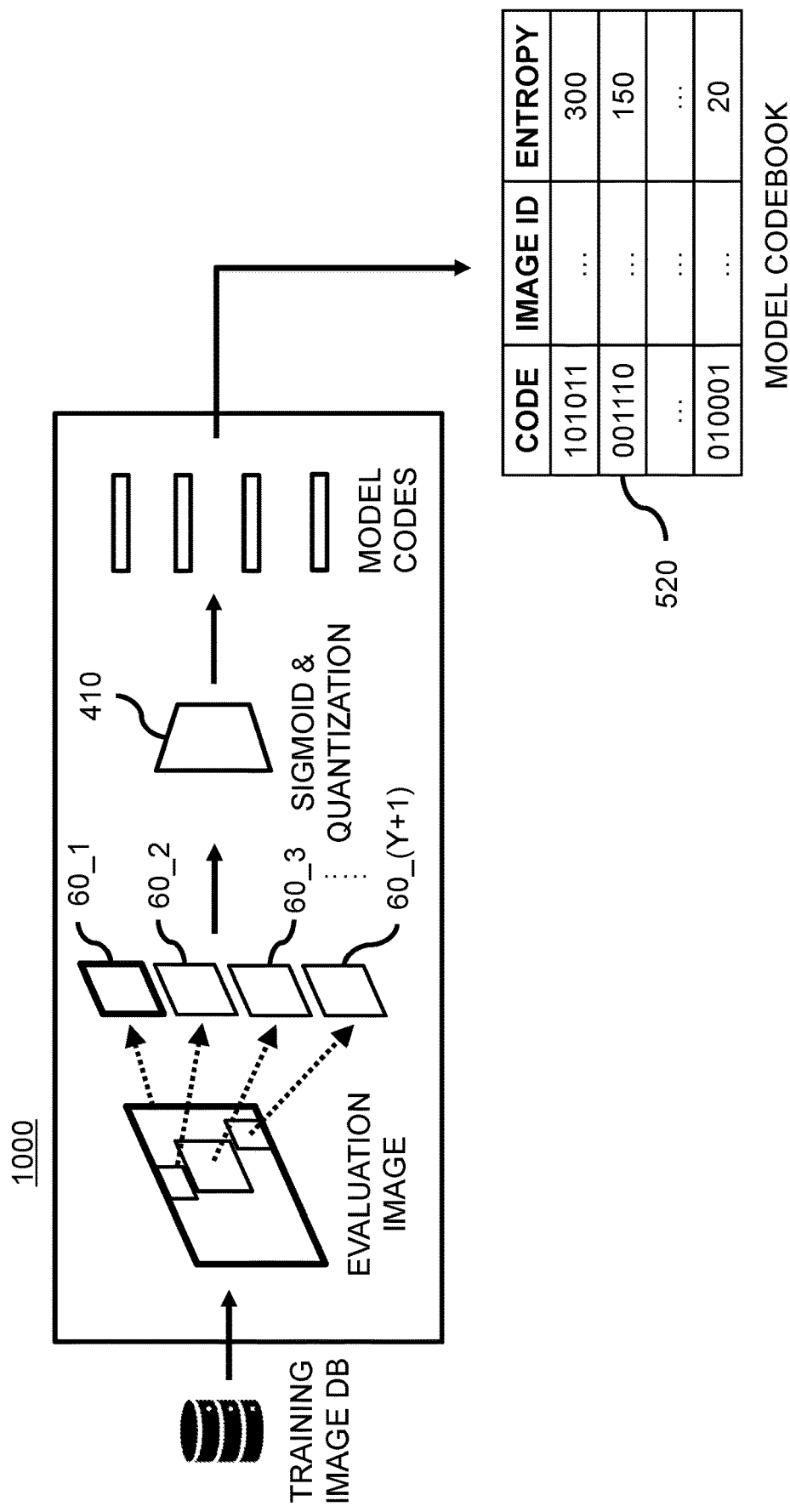

METHOD FOR EXPLAINABLE ACTIVE LEARNING, TO BE USED FOR OBJECT DETECTOR, BY USING BAYESIAN DUAL AUTOENCODER AND ACTIVE LEARNING DEVICE USING THE SAME

CROSS REFERENCE TO RELATED APPLICATION

This application claims the benefit of priority to U.S. Provisional Patent Application No. 63/021,809, filed on May 8, 2020, the entire contents of which being incorporated herein by reference.

FIELD OF THE DISCLOSURE

The present disclosure relates to a method for explainable active learning to be used for object detection by using a Bayesian dual autoencoder and an active learning device using the same; and more particularly, to the method of the explainable active learning, for the object detection by the Bayesian dual autoencoder, capable of (i) allowing information on whether an object of a specific type is present in an image to be confirmed, (ii) allowing information on why the image is selected to be confirmed as a result of reflecting scene characteristics of the image and accordingly (iii) allowing the image of the specific type to be sampled, and the active learning device using the same.

BACKGROUND OF THE DISCLOSURE

Recently, methods of performing object identification and the like making use of machine learning are being studied.

Deep learning, which is one type of the machine learning, uses a neural network with several hidden layers between an input layer and an output layer, and shows a high performance in recognition.

And the neural network using the deep learning is generally trained through backpropagation using losses.

In order to train such a deep learning network, conventionally, raw data is collected according to a data collection policy, and human labelers annotate the collected raw data to generate new training data. After that, the deep learning network is trained by using the new training data and existing training data. Then, human engineers modify and improve learning algorithms, to be used for training the deep learning network, by referring to an analysis result on performance. In addition, the data collection policy is revised by referring to the analysis result, re-examination is performed as to whether there is any wrong annotation, and revision of the wrong annotation is performed as the case may be.

However, as the performance of the deep learning network improves, the hard example useful for learning becomes scarce, thus the effect of improving the performance of the deep learning network using the new training data is reduced. And, as a database of labeled images becomes larger, the effect of improving the performance of the deep learning network is also reduced, thus the return on investment on the data annotation by the human labelers is reduced.

Meanwhile, in order to solve this problem, conventionally, instead of labeling all collected unlabeled images, an active learning technique is used which selects and labels only specific unlabeled images that are expected to have a great effect under current circumstances of, for example, a size of a database where the labeled images are stored, a performance of a model to be trained, etc.

In such conventional active learning technology, rare data are important from a perspective of data distribution, and such rare data are acquired by techniques such as querying from diverse subspaces or partitions, balance exploration and exploitation, etc.

In querying from the diverse subspaces or the partitions, unlabeled data are selected from non-overlapping or minimally overlapping partitions of the original feature space.

And, in the balance exploration and the exploitation, the choice of examples is seen as a dilemma between the exploration and the exploitation over the data space representation. In each round, this approach assigns a sampling distribution on the pool, and samples one point from this distribution.

Also, in the conventional active learning technology, a so-called difficult data from a perspective of a neural network model to be used for recognizing images, that is, rare data which are not learned enough by the neural network model or hard data which are difficult to be recognized by the neural network model, are seen as important, and such difficult data are acquired by techniques such as querying by committee, uncertainty sampling, etc.

In querying by the committee, unlabeled data are selected, for which a variety of models ("committee") votes on the output and disagrees the most.

And, in the uncertainty sampling, unlabeled data are selected, for which the current model is least certain (in terms of the softmax output score for classification, for example) as to what the correct output should be.

Herein, the conventional active learning techniques are applicable only to classification issues.

That is, for the classification issues, the conventional active learning techniques may map the whole of a given image with a size of H×W onto the feature space, such that images of similar scenes belong to a same subspace.

However, the conventional active learning techniques have difficulty in determining the rare images to be used for learning of object detection.

For example, images of a similar street scene must be mapped onto different subspaces depending on a presence or an absence of pedestrians, but the conventional active learning techniques classify them into the same subspace.

In addition, the conventional active learning techniques have a disadvantage in that in case of an image where a stop sign appears, the image cannot be mapped onto another subspace due to the small size of the stop sign compared to the size of the entire image.

That is, the area of the stop sign may be an area of an extremely small size such as a size of 50×50 and a size of 100×100, etc. on the image of a size of 1920×1080. In order to select images with one or more stop signs, all other parts except the areas of the stop signs should be ignored, however, such techniques cannot be implemented using the conventional active learning techniques.

Especially, from the perspective of the data distribution, the rare data do not necessarily result in a lower recognition performance, besides, even ordinary data of, for example, small objects and darker lighting environment can result in the lower recognition performance. Also, more pieces of data of a hard subspace must be selected than those of an easy subspace, however, an optimal balance on how many should be selected is difficult to find.

And, in the uncertainty sampling, a wrong answer may be outputted with a near 100% assurance if its model is overfitted, but it cannot be found out easily whether the wrong answer is caused by overfitting or the hard example.

Meanwhile, in querying by the committee, the hard example can be found more easily since a possibility of every model being overfitted or underfitted in a specific subspace is low, however, there is a disadvantage that a defect unique to a targeted model, for example, a subspace overfitted or underfitted, cannot be found, since general hard examples are found by using output mismatches among the multiple models while none of the output mismatches is applicable to a single model generally used in the neural network model of interest.

SUMMARY OF THE DISCLOSURE

It is an object of the present disclosure to solve all the aforementioned problems.

It is another object of the present disclosure to easily acquire one or more rare samples according to types of one or more objects in active learning.

It is still another object of the present disclosure to acquire the rare samples, on which information on whether an object of a specific type appears and information on characteristics of a whole scene are reflected, in the active learning.

It is still yet another object of the present disclosure to easily confirm reasons of selecting the rare samples in the active learning.

It is still yet another object of the present disclosure to easily select one or more unlabeled images only of a certain type from the acquired rare samples in the active learning.

It is still yet another object of the present disclosure to easily acquire the rare samples from a perspective of data distribution and one or more hard samples from a perspective of a model in the active learning.

In accordance with one aspect of the present disclosure, there is provided a method for explainable active learning, to be used for an object detector, by using a Bayesian dual encoder, including steps of: (a) if one or more test images are acquired, an active learning device performing or supporting another device to perform (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing corresponding to each of the test images into a same size, to thereby generate first resized images for testing to (n+1)-th resized images for testing, and (iv) a process of inputting the first resized images for testing to the (n+1)-th resized images for testing into a data encoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing; (b) the active learning device performing or supporting another device to perform (b1) one of (i) (i-1) a process of inputting the test images into the object detector, to thereby allow the object detector to apply m times of Monte Carlo dropouts to each of the test images and thus to generate first feature maps for testing to m-th feature maps for testing corresponding to each of the test images wherein m is an integer equal to or greater than 2, (i-2) a process of applying Bayesian output embedding operation to the first feature maps for testing to the m-th feature maps for testing, to thereby generate activation entropy maps for testing respectively corresponding to the test images, (i-3) a process of cropping one or more regions, corresponding to specific bounding boxes for testing determined as respectively enclosing the objects for testing among the bounding boxes for testing, in each of the activation entropy maps for testing, to thereby generate first cropped activation entropy maps for testing to o-th cropped activation entropy maps for testing wherein o is an integer equal to or less than n and (i-4) a process of resizing (1) each of the activation entropy maps for testing and (2) the first cropped activation entropy maps for testing to the o-th cropped activation entropy maps for testing corresponding to each of the activation entropy maps for testing into a same size, to thereby generate first resized activation entropy maps for testing to (o+1)-th resized activation entropy maps for testing, and (ii) (ii-1) a process of inputting first resized object images for testing to (o+1)-th resized object images for testing, determined as the objects for testing, among the first resized images for testing to the (n+1)-th resized images for testing into the object detector, to thereby allow the object detector to apply m times of the Monte Carlo dropouts to each of the first resized object images for testing to the (o+1)-th resized object images for testing and thus to generate first object feature maps for testing to m-th object feature maps for testing corresponding to each of the first resized object images for testing to the (o+1)-th resized object images for testing and (ii-2) a process of applying the Bayesian output embedding operation to the first feature maps for testing to the m-th feature maps for testing, to thereby generate the first resized activation entropy maps for testing to the (o+1)-th resized activation entropy maps for testing respectively corresponding to the first resized object images for testing to the (o+1)-th resized object images for testing and (b2) a process of inputting the first resized activation entropy maps for testing to the (o+1)-th resized activation entropy maps for testing into a model encoder, to thereby allow the model encoder to encode the first resized activation entropy maps for testing to the (o+1)-th resized activation entropy maps for testing and thus to output first model codes for testing to (o+1)-th model codes for testing corresponding to the first resized activation entropy maps for testing to the (o+1)-th resized activation entropy maps for testing; and (c) the active learning device performing or supporting another device to perform (i) (i-1) a process of confirming reference data codes corresponding to the number of the resized images equal to or less than a counter threshold by referring to a data codebook, wherein the data codebook is created by referring to previous training images used for pre-training the object detector and wherein the data codebook lists the number of the resized images per data code, (i-2) a process of extracting first specific data codes, respectively corresponding to the reference data codes, from the first data codes for testing to the (n+1)-th data codes for testing, (i-3) a process of selecting first specific test images, corresponding to the first specific data codes, as rare samples to be used for re-training the object detector, and (i-4) a process of updating the data codebook by referring to second specific data codes corresponding to the rare samples, and (ii) (ii-1) a process of confirming reference model codes, corresponding to average entropy values equal to or greater than an entropy threshold, by referring to a model codebook, wherein the model codebook is created by referring to evaluation images before re-training the object detector and wherein the model codebook lists the average entropy values in the resized activation entropy maps per model code of the evaluation images, (ii-2) a process of extracting specific model codes, corresponding to the reference model codes, from the first model codes for testing to the (o+1)-th model codes for testing, and (ii-3) a process of selecting second specific test images, corresponding to the specific model codes, as hard samples to be used for re-training the object detector.

As one example, the method further includes a step of: (d) the active learning device performing or supporting another device to perform a process of re-training the object detector by using the previous training images, the rare samples, and the hard samples.

As one example, at the step of (b), the active learning device performs or supports another device to perform one of (i) (i-1) a process of applying binary conversion to the first feature maps for testing to the m-th feature maps for testing, to thereby generate first binary feature maps for testing to m-th binary feature maps for testing, (i-2) a process of concatenating the first binary feature maps for testing to the m-th binary feature maps for testing, to thereby generate activation probability maps for testing, and (i-3) a process of generating the activation entropy maps for testing by referring to the activation probability maps for testing respectively corresponding to the test images, and (ii) (ii-1) a process of applying the binary conversion to first object feature maps for testing to m-th object feature maps for testing respectively corresponding to the first resized object images for testing to the (o+1)-th resized object images for testing, to thereby generate first binary object feature maps for testing to m-th binary object feature maps for testing respectively corresponding to the first resized object images for testing to the (o+1)-th resized object images for testing, (ii-2) a process of concatenating the first binary object feature maps for testing to the m-th binary object feature maps for testing, respectively corresponding to the first resized object images for testing to the (o+1)-th resized object images for testing, to thereby generate first object activation probability maps for testing to (o+1)-th object activation probability maps for testing respectively corresponding to the first resized object images for testing to the (o+1)-th resized object images for testing, and (ii-3) a process of generating the first resized activation entropy maps for testing to the (o+1)-th resized activation entropy maps for testing by referring to the first object activation probability maps for testing to the (o+1)-th object activation probability maps for testing.

As one example, at the step of (a), the active learning device performs or supports another device to perform a process of mapping mis-detected bounding boxes for testing, among the bounding boxes for testing, into background data codes.

As one example, at the step of (c), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1, and wherein the entropy threshold is one of (1) a predetermined average entropy value and (2) one among the average entropy values which corresponds to a threshold model code at an s-th position, within the model codebook, counted in an order from a largest average entropy value to a smallest average entropy value wherein s is an integer equal to or greater than 1.

As one example, before the step of (a), the method further includes a step of: (a1) the active learning device performing or supporting another device to perform (i) a process of cropping one or more object regions in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, (iv) a process of inputting the first resized object images for training to the (t+1)-th resized object images for training and the first resized background images for training to the u-th resized background images for training into the data encoder of a data autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training, (v) a process of inputting the first object data codes for training to the (t+1)-th object data codes for training into a data decoder of the data autoencoder, to thereby allow the data decoder to decode the first object data codes for training to the (t+1)-th object data codes for training and thus to output first reconstructed images for training to (t+1)-th reconstructed images for training, and (vi) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training and a process of training the data encoder by using one or more background losses calculated by referring to the first background data codes for training to the u-th background data codes for training.

As one example, the method further includes a step of: (a2) the active learning device performing or supporting another device to perform (i) a process of cropping the object regions in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

As one example, before the step of (a), the method further includes a step of: (a3) the active learning device performing or supporting another device to perform (i) one of (i-1) (i-1-a) a process of inputting training images, sampled from a training image database to be used for training the object detector, into the object detector, to thereby allow the object detector to apply m times of the Monte Carlo dropouts to each of the training images and thus to generate first feature maps for training to m-th feature maps for training corresponding to each of the training images, (i-1-b) a process of applying the Bayesian output embedding operation to the first feature maps for training to the m-th feature maps for training, to thereby generate activation entropy maps for training, (i-1-c) a process of cropping one or more regions, corresponding to one or more objects for training, in each of the activation entropy maps for training, to thereby generate first cropped activation entropy maps for training to x-th cropped activation entropy maps for training wherein x is an integer equal to or greater than 1, and (i-1-d) a process of resizing (1) each of the activation entropy maps for training and (2) the first cropped activation entropy maps for training to the x-th cropped activation entropy maps for training corresponding to each of the activation entropy maps for training into a same size, to thereby generate first resized activation entropy maps for training to (x+1)-th resized activation entropy maps for training, and (i-2) (i-2-a) a process of inputting each of first resized object images for training to (x+1)-th resized object images for training, created by resizing each of the training images and cropped object images for training to a same size wherein the cropped object images for training are created by cropping one or more object regions in each of the training images, into the object detector, to thereby allow the object detector to apply m times of the Monte Carlo dropouts to each of the first resized object images for training to the (x+1)-th resized object images for training and thus to generate first object feature maps for training to m-th object feature maps for training corresponding to each of the first resized object images for training to the (x+1)-th resized object images for training, (i-2-b) a process of applying the Bayesian output embedding operation to the first object feature maps for training to the m-th object feature maps for training, to thereby generate the first resized activation entropy maps for training to the (x+1)-th resized activation entropy maps for training respectively corresponding to the first resized object images for training to the (x+1)-th resized object images for training, (ii) a process of inputting the first resized activation entropy maps for training to the (x+1)-th resized activation entropy maps for training into the model encoder of a model autoencoder, to thereby allow the model encoder to encode the first resized activation entropy maps for training to the (x+1)-th resized activation entropy maps for training and thus to output first model codes for training to (x+1)-th model codes for training corresponding to the first resized activation entropy maps for training to the (x+1)-th resized activation entropy maps for training, (iii) a process of inputting the first model codes for training to the (x+1)-th model codes for training into a model decoder of the model autoencoder, to thereby allow the model decoder to decode the first model codes for training to the (x+1)-th model codes for training and thus to output first reconstructed entropy maps for training to (x+1)-th reconstructed entropy maps for training, (iv) a process of training the model decoder and the model encoder using one or more first entropy losses to one or more (x+1)-th entropy losses calculated by referring to the first resized activation entropy maps for training to the (x+1)-th resized activation entropy maps for training and the first reconstructed entropy maps for training to the (x+1)-th reconstructed entropy maps for training.

As one example, the method further includes a step of: (a4) the active learning device performing or supporting another device to perform (i) one of (i-1) (i-1-a) a process of inputting the evaluation images, sampled from the training image database, into the object detector, to thereby allow the object detector to apply m times of the Monte Carlo dropouts to each of the evaluation images and thus to generate first feature maps for evaluation to m-th feature maps for evaluation corresponding to each of the evaluation images, (i-1-b) a process of applying the Bayesian output embedding operation to the first feature maps for evaluation to the m-th feature maps for evaluation, to thereby generate activation entropy maps for evaluation, (i-1-c) a process of cropping one or more regions, corresponding to one or more objects for evaluation, in each of the activation entropy maps for evaluation, to thereby generate first cropped activation entropy maps for evaluation to y-th cropped activation entropy maps for evaluation wherein y is an integer equal to or greater than 1, and (i-1-d) a process of resizing (1) each of the activation entropy maps for evaluation and (2) the first cropped activation entropy maps for evaluation to the y-th cropped activation entropy maps for evaluation corresponding to each of the activation entropy maps for evaluation into a same size, to thereby generate first resized activation entropy maps for evaluation to (y+1)-th resized activation entropy maps for evaluation, and (i-2) (i-2-a) a process of inputting each of first resized object images for evaluation to (y+1)-th resized object images for evaluation, created by resizing each of the evaluation images and cropped object images for evaluation to a same size wherein the cropped object images for evaluation are created by cropping the object regions in the evaluation images, into the object detector, to thereby allow the object detector to apply m times of the Monte Carlo dropouts to each of the first resized object images for evaluation to the (y+1)-th resized object images for evaluation and thus to generate first object feature maps for evaluation to m-th object feature maps for evaluation corresponding to each of the first resized object images for evaluation to the (y+1)-th resized object images for evaluation, (i-2-b) a process of applying the Bayesian output embedding operation to the first object feature maps for evaluation to the m-th object feature maps for evaluation, to thereby generate the first resized activation entropy maps for evaluation to the (y+1)-th resized activation entropy maps for evaluation respectively corresponding to the first resized object images for evaluation to the (y+1)-th resized object images for evaluation, (ii) a process of inputting the first resized activation entropy maps for evaluation to the (y+1)-th resized activation entropy maps for evaluation into the model encoder of the model autoencoder, to thereby allow the model encoder to encode the first resized activation entropy maps for evaluation to the (y+1)-th resized activation entropy maps for evaluation and thus to output first model codes for evaluation to (y+1)-th model codes for evaluation corresponding to the first resized activation entropy maps for evaluation to the (y+1)-th resized activation entropy maps for evaluation, and (iii) a process of sorting the first model codes for evaluation to the (y+1)-th model codes for evaluation by the model codes and a process of generating the model codebook by referring to the average entropy values of the resized activation entropy maps corresponding to each of the model codes.

As one example, each time the object detector is trained and re-trained, the active learning device performs or supports another device to perform a process of training the model encoder and a process of generating the model cookbook.

In accordance with another aspect of the present disclosure, there is provided an active learning device for explainable active learning, to be used for an object detector, by using a Bayesian dual encoder, including: at least one memory that stores instructions; and at least one processor configured to execute the instructions to perform or support another device to perform: (I) if one or more test images are acquired, (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing corresponding to each of the test images into a same size, to thereby generate first resized images for testing to (n+1)-th resized images for testing, and (iv) a process of inputting the first resized images for testing to the (n+1)-th resized images for testing into a data encoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing, (II) (II-1) one of (i) (i-1) a process of inputting the test images into the object detector, to thereby allow the object detector to apply m times of Monte Carlo dropouts to each of the test images and thus to generate first feature maps for testing to m-th feature maps for testing corresponding to each of the test images wherein m is an integer equal to or greater than 2, (i-2) a process of applying Bayesian output embedding operation to the first feature maps for testing to the m-th feature maps for testing, to thereby generate activation entropy maps for testing respectively corresponding to the test images, (i-3) a process of cropping one or more regions, corresponding to specific bounding boxes for testing determined as respectively enclosing the objects for testing among the bounding boxes for testing, in each of the activation entropy maps for testing, to thereby generate first cropped activation entropy maps for testing to o-th cropped activation entropy maps for testing wherein o is an integer equal to or less than n and (i-4) a process of resizing (1) each of the activation entropy maps for testing and (2) the first cropped activation entropy maps for testing to the o-th cropped activation entropy maps for testing corresponding to each of the activation entropy maps for testing into a same size, to thereby generate first resized activation entropy maps for testing to (o+1)-th resized activation entropy maps for testing, and (ii) (ii-1) a process of inputting first resized object images for testing to (o+1)-th resized object images for testing, determined as the objects for testing, among the first resized images for testing to the (n+1)-th resized images for testing into the object detector, to thereby allow the object detector to apply m times of the Monte Carlo dropouts to each of the first resized object images for testing to the (o+1)-th resized object images for testing and thus to generate first object feature maps for testing to m-th object feature maps for testing corresponding to each of the first resized object images for testing to the (o+1)-th resized object images for testing and (ii-2) a process of applying the Bayesian output embedding operation to the first feature maps for testing to the m-th feature maps for testing, to thereby generate the first resized activation entropy maps for testing to the (o+1)-th resized activation entropy maps for testing respectively corresponding to the first resized object images for testing to the (o+1)-th resized object images for testing and (11-2) a process of inputting the first resized activation entropy maps for testing to the (o+1)-th resized activation entropy maps for testing into a model encoder, to thereby allow the model encoder to encode the first resized activation entropy maps for testing to the (o+1)-th resized activation entropy maps for testing and thus to output first model codes for testing to (o+1)-th model codes for testing corresponding to the first resized activation entropy maps for testing to the (o+1)-th resized activation entropy maps for testing, and (III) (i) (i-1) a process of confirming reference data codes corresponding to the number of the resized images equal to or less than a counter threshold by referring to a data codebook, wherein the data codebook is created by referring to previous training images used for pre-training the object detector and wherein the data codebook lists the number of the resized images per data code, (i-2) a process of extracting first specific data codes, respectively corresponding to the reference data codes, from the first data codes for testing to the (n+1)-th data codes for testing, (i-3) a process of selecting first specific test images, corresponding to the first specific data codes, as rare samples to be used for re-training the object detector, and (i-4) a process of updating the data codebook by referring to second specific data codes corresponding to the rare samples, and (ii) (ii-1) a process of confirming reference model codes, corresponding to average entropy values equal to or greater than an entropy threshold, by referring to a model codebook, wherein the model codebook is created by referring to evaluation images before re-training the object detector and wherein the model codebook lists the average entropy values in the resized activation entropy maps per model code of the evaluation images, (ii-2) a process of extracting specific model codes, corresponding to the reference model codes, from the first model codes for testing to the (o+1)-th model codes for testing, and (ii-3) a process of selecting second specific test images, corresponding to the specific model codes, as hard samples to be used for re-training the object detector.

As one example, the processor further performs: (IV) a process of re-training the object detector by using the previous training images, the rare samples, and the hard samples.

As one example, at the process of (II), the processor performs or supports another device to perform one of (i) (i-1) a process of applying binary conversion to the first feature maps for testing to the m-th feature maps for testing, to thereby generate first binary feature maps for testing to m-th binary feature maps for testing, (i-2) a process of concatenating the first binary feature maps for testing to the m-th binary feature maps for testing, to thereby generate activation probability maps for testing, and (i-3) a process of generating the activation entropy maps for testing by referring to the activation probability maps for testing respectively corresponding to the test images, and (ii) (ii-1) a process of applying the binary conversion to first object feature maps for testing to m-th object feature maps for testing respectively corresponding to the first resized object images for testing to the (o+1)-th resized object images for testing, to thereby generate first binary object feature maps for testing to m-th binary object feature maps for testing respectively corresponding to the first resized object images for testing to the (o+1)-th resized object images for testing, (ii-2) a process of concatenating the first binary object feature maps for testing to the m-th binary object feature maps for testing, respectively corresponding to the first resized object images for testing to the (o+1)-th resized object images for testing, to thereby generate first object activation probability maps for testing to (o+1)-th object activation probability maps for testing respectively corresponding to the first resized object images for testing to the (o+1)-th resized object images for testing, and (ii-3) a process of generating the first resized activation entropy maps for testing to the (o+1)-th resized activation entropy maps for testing by referring to the first object activation probability maps for testing to the (o+1)-th object activation probability maps for testing.

As one example, at the process of (I), the processor performs or supports another device to perform a process of mapping mis-detected bounding boxes for testing, among the bounding boxes for testing, into background data codes.

As one example, at the process of (III), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1, and wherein the entropy threshold is one of (1) a predetermined average entropy value and (2) one among the average entropy values which corresponds to a threshold model code at an s-th position, within the model codebook, counted in an order from a largest average entropy value to a smallest average entropy value wherein s is an integer equal to or greater than 1.

As one example, before the process of (I), the processor further performs: (I1) (i) a process of cropping one or more object regions in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, (iv) a process of inputting the first resized object images for training to the (t+1)-th resized object images for training and the first resized background images for training to the u-th resized background images for training into the data encoder of a data autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training, (v) a process of inputting the first object data codes for training to the (t+1)-th object data codes for training into a data decoder of the data autoencoder, to thereby allow the data decoder to decode the first object data codes for training to the (t+1)-th object data codes for training and thus to output first reconstructed images for training to (t+1)-th reconstructed images for training, and (vi) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training and a process of training the data encoder by using one or more background losses calculated by referring to the first background data codes for training to the u-th background data codes for training.

As one example, the processor further performs: (12) (i) a process of cropping the object regions in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

As one example, before the process of (I), the processor further performs: (I3) (i) one of (i-1) (i-1-a) a process of inputting training images, sampled from a training image database to be used for training the object detector, into the object detector, to thereby allow the object detector to apply m times of the Monte Carlo dropouts to each of the training images and thus to generate first feature maps for training to m-th feature maps for training corresponding to each of the training images, (i-1-b) a process of applying the Bayesian output embedding operation to the first feature maps for training to the m-th feature maps for training, to thereby generate activation entropy maps for training, (i-1-c) a process of cropping one or more regions, corresponding to one or more objects for training, in each of the activation entropy maps for training, to thereby generate first cropped activation entropy maps for training to x-th cropped activation entropy maps for training wherein x is an integer equal to or greater than 1, and (i-1-d) a process of resizing (1) each of the activation entropy maps for training and (2) the first cropped activation entropy maps for training to the x-th cropped activation entropy maps for training corresponding to each of the activation entropy maps for training into a same size, to thereby generate first resized activation entropy maps for training to (x+1)-th resized activation entropy maps for training, and (i-2) (i-2-a) a process of inputting each of first resized object images for training to (x+1)-th resized object images for training, created by resizing each of the training images and cropped object images for training to a same size wherein the cropped object images for training are created by cropping one or more object regions in each of the training images, into the object detector, to thereby allow the object detector to apply m times of the Monte Carlo dropouts to each of the first resized object images for training to the (x+1)-th resized object images for training and thus to generate first object feature maps for training to m-th object feature maps for training corresponding to each of the first resized object images for training to the (x+1)-th resized object images for training, (i-2-b) a process of applying the Bayesian output embedding operation to the first object feature maps for training to the m-th object feature maps for training, to thereby generate the first resized activation entropy maps for training to the (x+1)-th resized activation entropy maps for training respectively corresponding to the first resized object images for training to the (x+1)-th resized object images for training, (ii) a process of inputting the first resized activation entropy maps for training to the (x+1)-th resized activation entropy maps for training into the model encoder of a model autoencoder, to thereby allow the model encoder to encode the first resized activation entropy maps for training to the (x+1)-th resized activation entropy maps for training and thus to output first model codes for training to (x+1)-th model codes for training corresponding to the first resized activation entropy maps for training to the (x+1)-th resized activation entropy maps for training, (iii) a process of inputting the first model codes for training to the (x+1)-th model codes for training into a model decoder of the model autoencoder, to thereby allow the model decoder to decode the first model codes for training to the (x+1)-th model codes for training and thus to output first reconstructed entropy maps for training to (x+1)-th reconstructed entropy maps for training, (iv) a process of training the model decoder and the model encoder using one or more first entropy losses to one or more (x+1)-th entropy losses calculated by referring to the first resized activation entropy maps for training to the (x+1)-th resized activation entropy maps for training and the first reconstructed entropy maps for training to the (x+1)-th reconstructed entropy maps for training.

As one example, the processor further performs: (14) (i) one of (i-1) (i-1-a) a process of inputting the evaluation images, sampled from the training image database, into the object detector, to thereby allow the object detector to apply m times of the Monte Carlo dropouts to each of the evaluation images and thus to generate first feature maps for evaluation to m-th feature maps for evaluation corresponding to each of the evaluation images, (i-1-b) a process of applying the Bayesian output embedding operation to the first feature maps for evaluation to the m-th feature maps for evaluation, to thereby generate activation entropy maps for evaluation, (i-1-c) a process of cropping one or more regions, corresponding to one or more objects for evaluation, in each of the activation entropy maps for evaluation, to thereby generate first cropped activation entropy maps for evaluation to y-th cropped activation entropy maps for evaluation wherein y is an integer equal to or greater than 1, and (i-1-d) a process of resizing (1) each of the activation entropy maps for evaluation and (2) the first cropped activation entropy maps for evaluation to the y-th cropped activation entropy maps for evaluation corresponding to each of the activation entropy maps for evaluation into a same size, to thereby generate first resized activation entropy maps for evaluation to (y+1)-th resized activation entropy maps for evaluation, and (i-2) (i-2-a) a process of inputting each of first resized object images for evaluation to (y+1)-th resized object images for evaluation, created by resizing each of the evaluation images and cropped object images for evaluation to a same size wherein the cropped object images for evaluation are created by cropping the object regions in the evaluation images, into the object detector, to thereby allow the object detector to apply m times of the Monte Carlo dropouts to each of the first resized object images for evaluation to the (y+1)-th resized object images for evaluation and thus to generate first object feature maps for evaluation to m-th object feature maps for evaluation corresponding to each of the first resized object images for evaluation to the (y+1)-th resized object images for evaluation, (i-2-b) a process of applying the Bayesian output embedding operation to the first object feature maps for evaluation to the m-th object feature maps for evaluation, to thereby generate the first resized activation entropy maps for evaluation to the (y+1)-th resized activation entropy maps for evaluation respectively corresponding to the first resized object images for evaluation to the (y+1)-th resized object images for evaluation, (ii) a process of inputting the first resized activation entropy maps for evaluation to the (y+1)-th resized activation entropy maps for evaluation into the model encoder of the model autoencoder, to thereby allow the model encoder to encode the first resized activation entropy maps for evaluation to the (y+1)-th resized activation entropy maps for evaluation and thus to output first model codes for evaluation to (y+1)-th model codes for evaluation corresponding to the first resized activation entropy maps for evaluation to the (y+1)-th resized activation entropy maps for evaluation, and (iii) a process of sorting the first model codes for evaluation to the (y+1)-th model codes for evaluation by the model codes and a process of generating the model codebook by referring to the average entropy values of the resized activation entropy maps corresponding to each of the model codes.

As one example, each time the object detector is trained and re-trained, the processor performs or supports another device to perform a process of training the model encoder and a process of generating the model cookbook.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 9 is a drawing schematically illustrating processes of generating the model codebook in accordance with one example embodiment of the present disclosure.

DETAILED DESCRIPTION OF THE PREFERRED EMBODIMENTS

Figure 1:
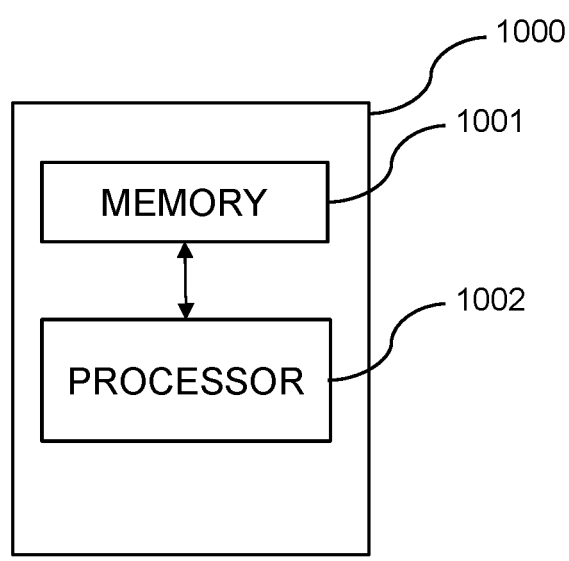
FIG. 1 is a drawing schematically illustrating an active learning device performing explainable active learning, to be used for an object detector, by using a Bayesian dual autoencoder in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

To allow those skilled in the art to carry out the present disclosure easily, the example embodiments of the present disclosure by referring to attached diagrams will be explained in detail as shown below.

FIG. 1 is a drawing schematically illustrating an active learning device performing explainable active learning, to be used for an object detector, by using a Bayesian dual autoencoder in accordance with one example embodiment of the present disclosure. By referring to FIG. 1, the active learning device 1000 may include a memory 1001 for storing instructions to perform the explainable active learning by using the Bayesian dual autoencoder in order to sample one or more training images to be used for training the object detector, and a processor 1002 for performing the explainable active learning by using the Bayesian dual autoencoder in order to sample the training images to be used for training the object detector according to the instructions in the memory 1001.

Specifically, the active learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Figure 2:
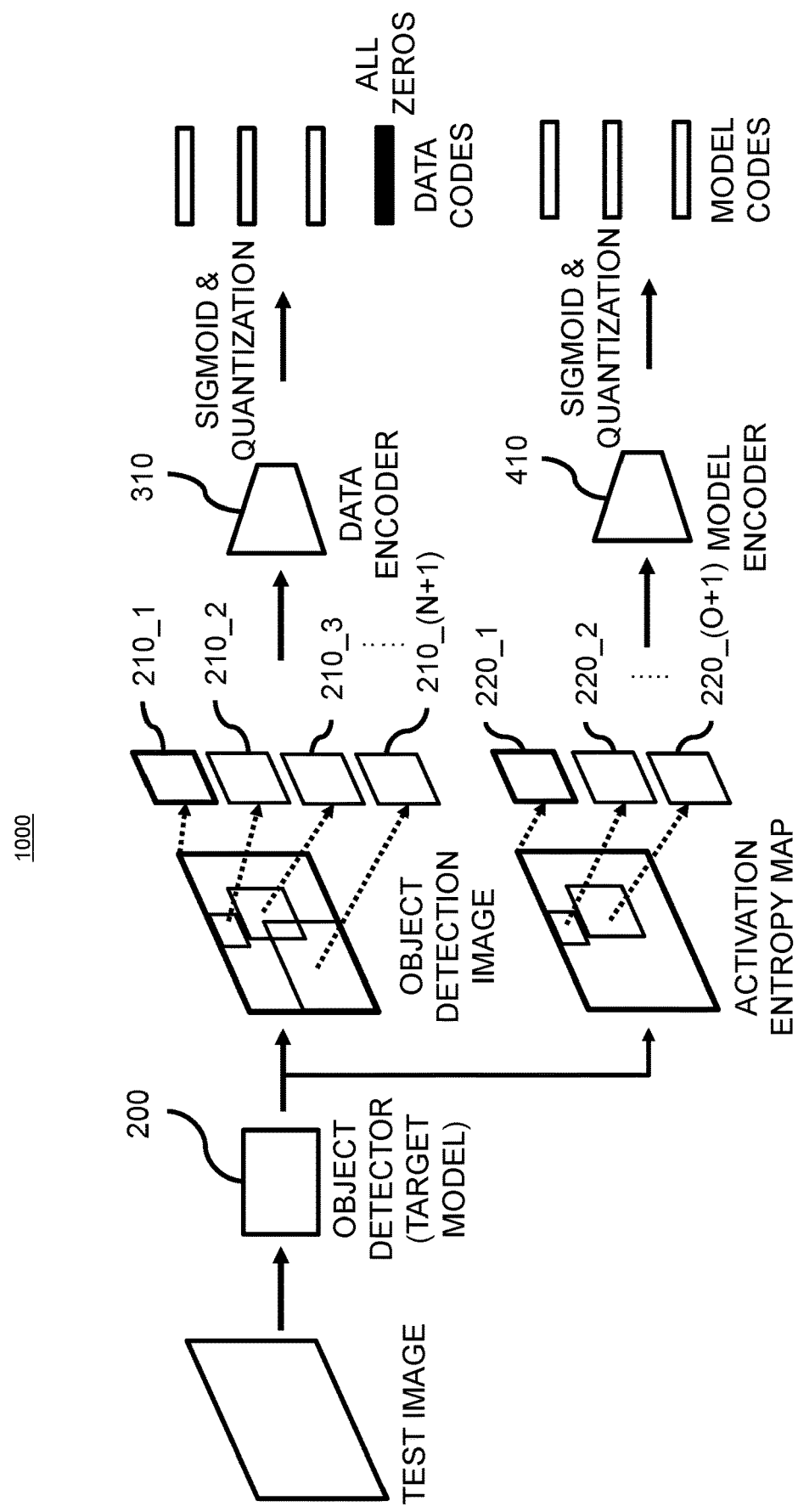
FIG. 2 is a drawing schematically illustrating a method for the explainable active learning, to be used for the object detector, by using the Bayesian dual autoencoder in accordance with one example embodiment of the present disclosure.

A method for the explainable active learning by using the active learning device 1000 configured as such is described by referring to FIG. 2 as follows.

First, if one or more test images are acquired, the active learning device 1000 may perform or support another device to perform a process of inputting the test images into the object detector 200, to thereby allow the object detector 200 to detect one or more objects for testing in each of the test images and thus to output bounding boxes for testing. Also, the object detector 200 may output class information for testing corresponding to the objects for testing and various detection information related to the objects for testing.

Herein, the object detector 200 may perform or support another device to perform a process of setting a detection threshold as low, to thereby detect the bounding boxes for testing as many as possible including some specific bounding boxes whose foreground class scores on the test images are low. As a result, an incorrect determination, representing that an object is determined incorrectly as not appearing although it actually appears, may be prevented as much as possible, and especially, an object of a difficult type to detect may be properly detected.

Also, the object detector 200 may have been trained in advance to detect objects on inputted images.

Also, the test images may be (1) images acquired from an image capture device linked to a device where the object detector 200 is installed, (2) images collected for tasks to be performed by the object detector 200, or (3) unlabeled images on which a labeling process is not performed.

As one example, the test images may be driving images acquired by a camera, a LiDAR, a radar, etc. while a vehicle is driven.

Next, the active learning device 1000 may perform or support another device to perform (i) a process of cropping one or more regions, respectively corresponding to the bounding boxes for testing, in each of the test images, to thereby generate first cropped images for testing to n-th cropped images for testing and (ii) a process of resizing (1) each of the test images and (2) the first cropped images for testing to the n-th cropped images for testing corresponding to each of the test images into a same size, to thereby generate first resized images for testing 210_1 to (n+1)-th resized images for testing 210_(n+1). Herein, n may be an integer equal to or greater than 1.

Next, the active learning device 1000 may perform or support another device to perform a process of inputting the first resized images for testing 210_1 to the (n+1)-th resized images for testing 210_(n+1) into a data encoder 310, to thereby allow the data encoder 310 to encode the first resized images for testing 210_1 to the (n+1)-th resized images for testing 210_(n+1) and thus to output first data codes for testing to (n+1)-th data codes for testing respectively corresponding to the first resized images for testing 210_1 to the (n+1)-th resized images for testing 210_(n+1).

Herein, the active learning device 1000 may apply an activation function, such as a sigmoid function, to outputs from the data encoder 310, to thereby acquire the first data codes for testing to the (n+1)-th data codes for testing.

And the data codes may be in d dimension and may have a range of [0, 1], and also, may be subspace for each of the resized images. And the data codes corresponding to background may be represented by all zeros. Also, the data codes of the resized images corresponding to mis-detected bounding boxes for testing may be mapped into background data codes, i.e., all zeros.

Next, the active learning device 1000 may perform or support another device to perform (i) a process of inputting the test images into the object detector 200, to thereby allow the object detector 200 to apply m times of Monte Carlo dropouts to each of the test images and thus to generate first feature maps for testing to m-th feature maps for testing corresponding to each of the test images and (ii) a process of applying Bayesian output embedding operation to the first feature maps for testing to the m-th feature maps for testing, to thereby generate activation entropy maps for testing respectively corresponding to the test images. Herein, m may be an integer equal to or greater than 2.

Figure 3:
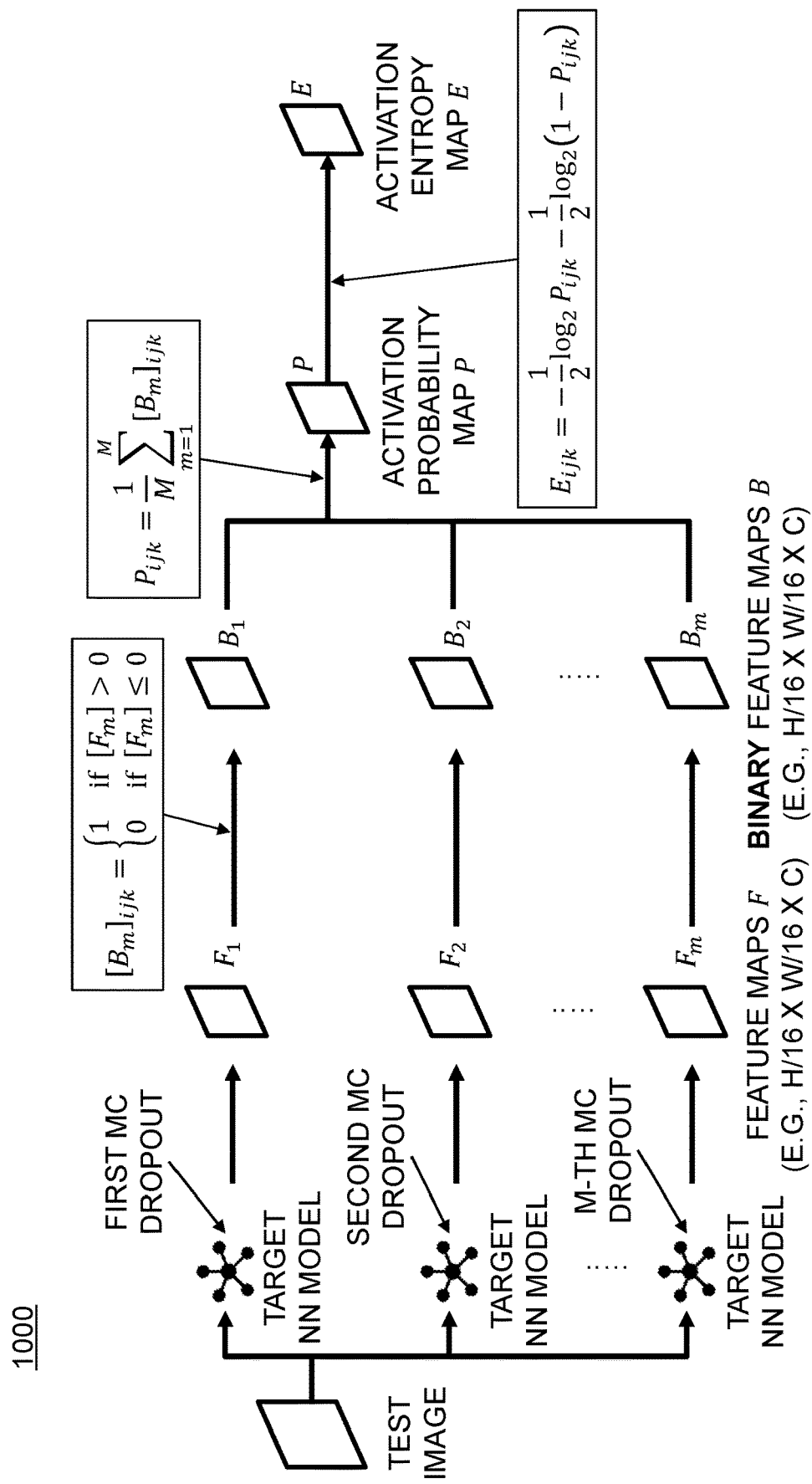
FIG. 3 is a drawing schematically illustrating processes of generating an activation entropy map in accordance with one example embodiment of the present disclosure.

That is, by referring to FIG. 3, the active learning device 1000 may input the test images into the object detector 200, to thereby allow the object detector 200 to execute inference on the test images, and thus to execute dropouts on specific layers in the object detector 200. More preferably, the dropouts may be performed on the specific layers in convolutional blocks of the object detector 200.

Herein, each of the dropouts on each of the specific layers may be, for example, the Monte Carlo dropout, and may be calculated by a following equation.

$$X'_{ijk} = \begin{cases} 0 \text{ with } p \\ \dfrac{X_{ijk}}{1-p} \text{ with } 1-p \end{cases}$$

In the above equation, i may represent a pixel location in a direction of a height of the test images, j may represent a pixel location in a direction of a width of the test images, and k may represent a channel of the test images.

Meanwhile, if the object detector 200 has been trained without using the dropouts, a probability of a dropout may be set as sufficiently low, for example, 0.01 to 0.1.

Therefore, the active learning device 1000 may perform or support another device to perform (i) a process of instructing the object detector 200 to apply m times of the dropouts to the test images, to thereby output the first feature maps for testing $F_1$ to the m-th feature maps for testing $F_m$ corresponding to each of the test images, (ii) a process of generating each of activation probability maps for testing corresponding to the first feature maps for testing $F_1$ to the m-th feature maps for testing $F_m$, and (iii) a process of generating each of activation entropy maps for testing by calculating entropies of each of the activation probability maps for testing.

That is, the active learning device 1000 may perform or support another device to perform (i) a process of applying binary conversion to the first feature maps for testing $F_1$ to the m-th feature maps for testing $F_m$, to thereby generate first binary feature maps for testing $B_1$ to m-th binary feature maps for testing $B_m$, (ii) a process of concatenating the first binary feature maps for testing $B_1$ to the m-th binary feature maps for testing $B_m$, to thereby generate each of the activation probability maps for testing, and (iii) a process of generating each of the activation entropy maps for testing by referring to each of the activation probability maps for testing.

In detail, the active learning device 1000 may perform or support another device to perform, for example, a process of applying a binary function, defined by an equation below, to each of the first feature maps for testing $F_1$ to the m-th feature maps for testing $F_m$, to thereby generate the first binary feature maps for testing $B_1$ to the m-th binary feature maps for testing $B_m$.

$$[B_m]_{ijk} = \begin{cases} 1 \text{ if } [F_m] > 0 \\ 0 \text{ if } [F_m] \leq 0 \end{cases}$$

And, using an equation below, the active learning device 1000 may perform or support another device to perform a process of generating each of the activation probability maps for testing corresponding to each of the test images by referring to each of probabilities of the first binary feature maps for testing $B_1$ to the m-th binary feature maps for testing $B_m$.

$$P_{iijk} = \dfrac{1}{M} \sum_{m=1}^{M} [B_m]_{ijk}$$

Thereafter, the active learning device 1000 may perform or support another device to perform a process of calculating the entropies of each of the activation probability maps for testing by using an equation below, to thereby generate each of the activation entropy maps for testing.

$$E_{ijk} = -\frac{1}{2}\log_2 P_{ijk} - \frac{1}{2}\log_2(1 - P_{ijk})$$

That is, the active learning device 1000 may apply m times of the dropouts to the test images, and then calculate the entropies of the feature maps.

Herein, the entropy may result in two classes representing whether a feature is activated or not. This is because a final output of the object detector 200 is affected more by whether the feature is activated or not than by differences among activation values, in general.

And, by applying perturbation to the object detector 200 itself, an unstable subspace of a target model is detected more efficiently. Herein, a connection from the object detector 200 to a part of outputs may be severed forcefully, by applying the perturbation to the object detector 200 itself.

That is, in general, if the subspace is learned stably, features are not significantly affected by severing of a few connections.

However, if the subspace is unstable, for example, if the subspace is overfitted or underfitted, the features may be significantly affected by a little perturbation.

Therefore, because the subspace itself may change if inputs are transformed in various ways, for example, by using data augmentation, the present disclosure prevents the subspace itself from changing by using a Bayesian method which perturbs the object detector 200.

By referring to FIG. 2 again, the active learning device 1000 may perform or support another device to perform (i) a process of cropping one or more regions, corresponding to specific bounding boxes for testing determined as respectively enclosing the objects for testing among the bounding boxes for testing, in each of the activation entropy maps for testing, to thereby generate first cropped activation entropy maps for testing to o-th cropped activation entropy maps for testing and (ii) a process of resizing (1) each of the activation entropy maps for testing and (2) the first cropped activation entropy maps for testing to the o-th cropped activation entropy maps for testing corresponding to each of the activation entropy maps for testing into a same size, to thereby generate first resized activation entropy maps for testing 220_1 to (o+1)-th resized activation entropy maps for testing 220_(o+1). Herein, o may be an integer equal to or less than n.

Herein, since sizes of the activation entropy maps are smaller than those of the test images, sizes of the resized activation entropy maps may be made larger than those of the resized images.

Meanwhile, the activation entropy maps for testing are created and then their object regions are cropped as in the above description, however, as another example, the object regions may be cropped and then cropped images may be used for creating the activation entropy maps for testing.

That is, the active learning device 1000 may perform or support another device to perform a process of inputting first resized object images for testing to (o+1)-th resized object images for testing, determined as the objects for testing, among the first resized images for testing to the (n+1)-th resized images for testing into the object detector 200, to thereby allow the object detector 200 to apply m times of the Monte Carlo dropouts to each of the first resized object images for testing to the (o+1)-th resized object images for testing and thus to generate first object feature maps for testing to m-th object feature maps for testing corresponding to each of the first resized object images for testing to the (o+1)-th resized object images for testing. Herein, each group, comprised of each first object feature map for testing to each m-th object feature map for testing, may be generated for each resized object image for testing. And the active learning device 1000 may perform or support another device to perform a process of applying the Bayesian output embedding operation to the first object feature maps for testing to the m-th object feature maps for testing, to thereby generate the first resized activation entropy maps for testing 220_1 to the (o+1)-th resized activation entropy maps for testing 220_(o+1) respectively corresponding to the first resized object images for testing to the (o+1)-th resized object images for testing.

In detail, the active learning device 1000 may perform or support another device to perform a process of applying the binary conversion to the first object feature maps for testing to the m-th object feature maps for testing corresponding to each of the first resized object images for testing to the (o+1)-th resized object images for testing, to thereby generate first binary object feature maps for testing to m-th binary object feature maps for testing corresponding to each of the first resized object images for testing to the (o+1)-th resized object images for testing. And the active learning device 1000 may perform or support another device to perform (i) a process of concatenating the first binary object feature maps for testing to the m-th binary object feature maps for testing, corresponding to each of the first resized object images for testing to the (o+1)-th resized object images for testing, to thereby generate first object activation probability maps for testing to (o+1)-th object activation probability maps for testing respectively corresponding to the first resized object images for testing to the (o+1)-th resized object images for testing and (ii) a process of generating the first resized activation entropy maps for testing to the (o+1)-th resized activation entropy maps for testing by referring to the first object activation probability maps for testing to the (o+1)-th object activation probability maps for testing.

Next, the active learning device 1000 may perform or support another device to perform a process of inputting the first resized activation entropy maps for testing 220_1 to the (o+1)-th resized activation entropy maps for testing 220_(o+1) into a model encoder 410, to thereby allow the model encoder 410 to encode the first resized activation entropy maps for testing 220_1 to the (o+1)-th resized activation entropy maps for testing 220_(o+1) and thus to output first model codes for testing to (o+1)-th model codes for testing corresponding to the first resized activation entropy maps for testing 220_1 to the (o+1)-th resized activation entropy maps for testing 220_(o+1).

Herein, the model codes may be in d' dimension and may have a range of [0, 1], and each of the model codes may represent each type of stabilities of the object detector 200.

Figure 4:
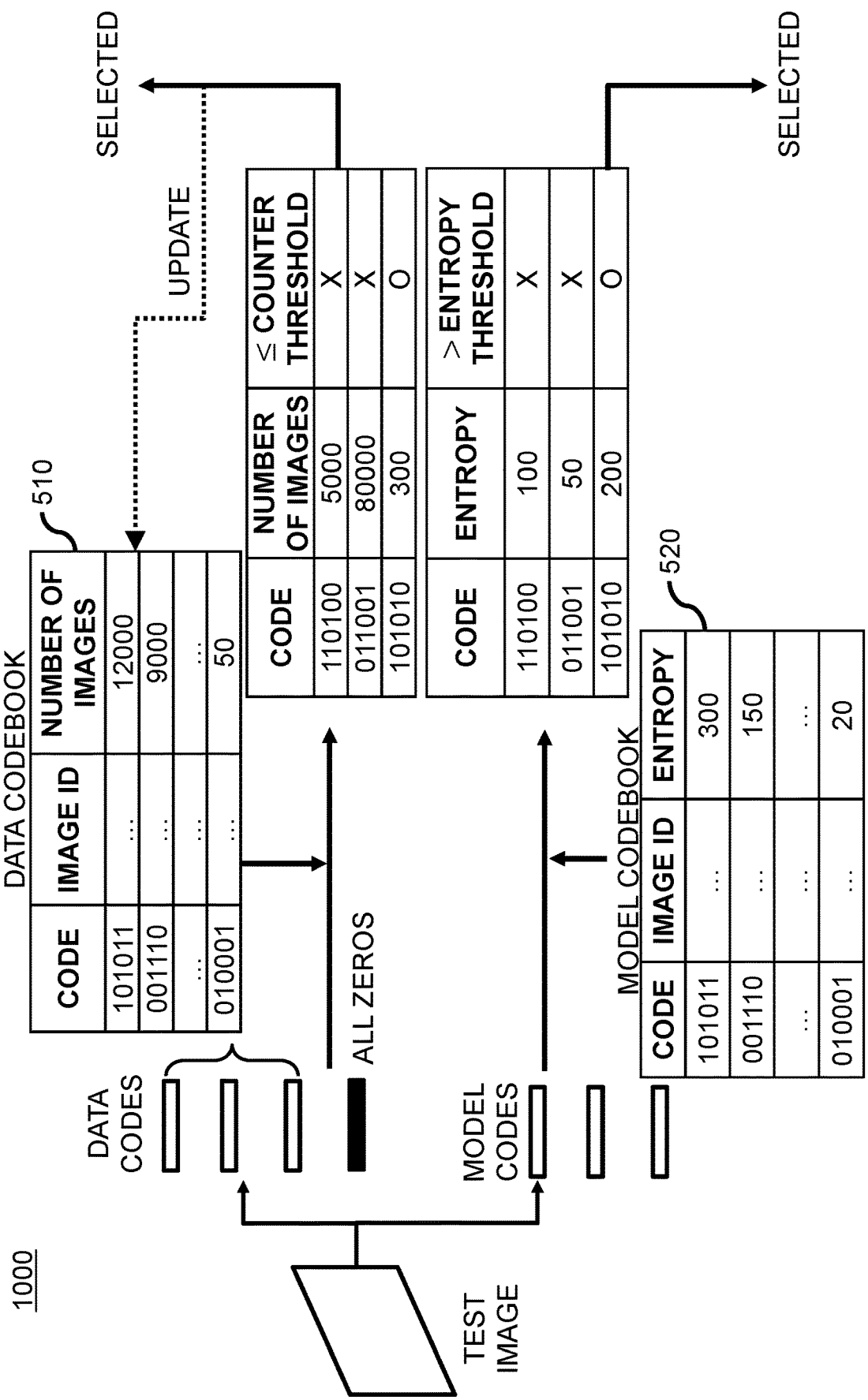
FIG. 4 is a drawing schematically illustrating processes of selecting a sample image, to be used for training the object detector, by using a data codebook and a model codebook, in accordance with one example embodiment of the present disclosure.

Next, by referring to FIG. 4, the active learning device 1000 may perform or support another device to perform (i) a process of confirming reference data codes corresponding to the number of the resized images equal to or less than a counter threshold by referring to a data codebook 510, which is created by referring to previous training images used for pre-training the object detector 200, (ii) a process of extracting first specific data codes, respectively corresponding to the reference data codes, from the first data codes for testing to the (n+1)-th data codes for testing, (iii) a process of selecting first specific test images, corresponding to the first specific data codes, as rare samples to be used for re-training the object detector 200, and (iv) a process of updating the data codebook 510 by referring to second specific data codes corresponding to the rare samples. Processes of generating the data codebook 510 will be described later.

Herein, the counter threshold may be one of (1) a predetermined counted number and (2) the number of the resized images corresponding to a threshold data code at a q-th position, within the data codebook 510, counted in an order from a largest counted number to a smallest counted number of the resized images. Herein, q may be an integer equal to or greater than 1.

That is, if the number of the images corresponding to each of the subspaces, i.e., the data codes, is smaller, then such a subspace may be determined as a rare subspace which has not been learned sufficiently during pre-training of the object detector 200. Then accordingly, by using the data codebook, the test images corresponding to the first specific data codes, which have not been learned sufficiently during the pre-training of the object detector 200, may be set as the rare samples. Therefore, the data codebook 510 may be updated by using the second specific data codes corresponding to the sampled specific test images, and after re-training the object detector 200, the data codebook 510 may be used as criteria for sampling new rare images from new test images.

And each time the object detector 200 is re-trained, the model cookbook 510 may also be updated.

Also, the active learning device 1000 may perform or support another device to perform (i) a process of confirming reference model codes, corresponding to average entropy values equal to or greater than an entropy threshold, by referring to a model codebook 520, created according to evaluation images, i.e., images for evaluation, before re-training the object detector 200, (ii) a process of extracting specific model codes, corresponding to the reference model codes, from the first model codes for testing to the (o+1)-th model codes for testing, and (iii) a process of selecting second specific test images, corresponding to the specific model codes, as hard samples to be used for re-training the object detector 200. Processes of generating the model codebook 520 will be described later.

Herein, the entropy threshold may be one of (1) a predetermined average entropy value and (2) one among the average entropy values which corresponds to a threshold model code at an s-th position, within the model codebook 520, counted in an order from a largest average entropy value to a smallest average entropy value. Herein, s may be an integer equal to or greater than 1.

That is, if the average entropy values corresponding to the types of the stabilities, which may be represented by the model codes, are larger, then the objects for testing may be of types that are difficult to recognize by the trained object detector 200 at the time, thus accordingly, the model codebook 520 may be used for determining the test images, including the model codes corresponding to the types difficult to recognize by the object detector 200, as the hard samples.

For reference, while the data codebook 510 may be updated each time the object detector 200 is re-trained, the model codebook 520 may be newly created before the object detector 200 is re-trained.

That is, if the object detector 200 is re-trained, then the types of the objects for testing difficult to be determined previously may easily be determined, or the types may be determined as different from before. In other words, easy types may be classified into a broader category, and difficult types may be divided into smaller categories. Therefore, the model codebook 520 may be newly created after the object detector 200 is re-trained, to thereby allow a state of the object detector 200 currently trained may be reflected.

Figure 5:
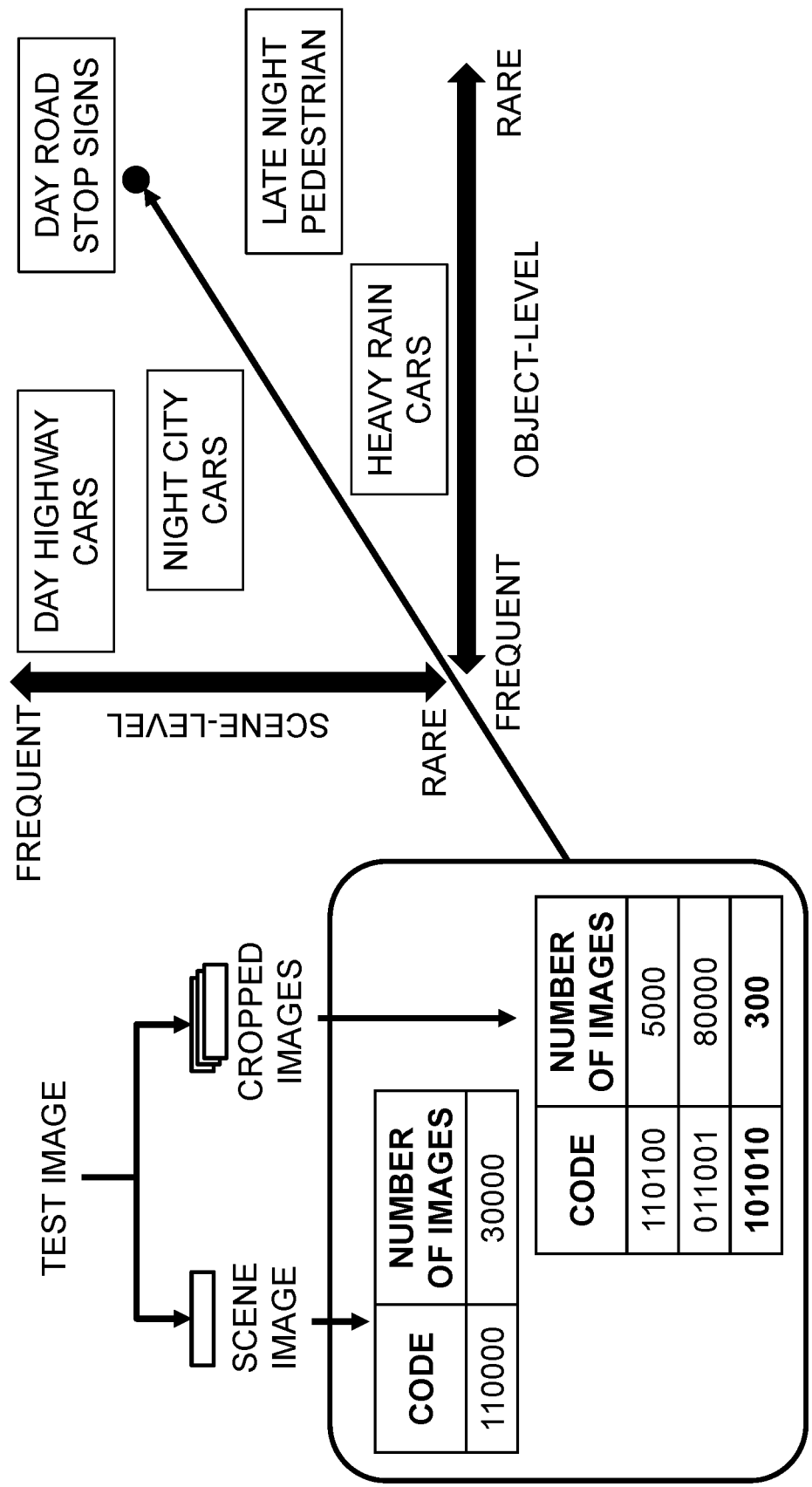
FIG. 5 is a drawing schematically illustrating explanation of reasons of selecting training images according to the data codebook in accordance with one example embodiment of the present disclosure.

Next, by referring to FIG. 5, one or more reasons that specific test images are selected as the rare samples may be confirmed by using the data codebook generated as above.

That is, the test images may be explained by using scene levels and object levels with the data codebook, and the reasons of the selection may be confirmed using the scene levels and the object levels. Herein, the scene levels may represent each frequency of each same scene being detected and the object levels may represent each frequency of each same object being detected.

As one example, while a vehicle is driven on a road in daylight, that is, if a scene of the test images corresponds to "day road", it can be seen that a stop sign rarely appears.

Also, a vehicle detected in a scene of "heavy rain" appears as blotted and smeared due to the heavy rain, therefore rarely appears at the object level than a vehicle detected in a scene of "day highway".

Next, the active learning device 1000 may perform or support another device to perform a process of re-training the object detector 200 by using the previous training images, the rare samples, and the hard samples.

Meanwhile, processes of training the data encoder and the model encoder and processes of creating the data codebook and the model codebook are described as follows.

Figure 6:
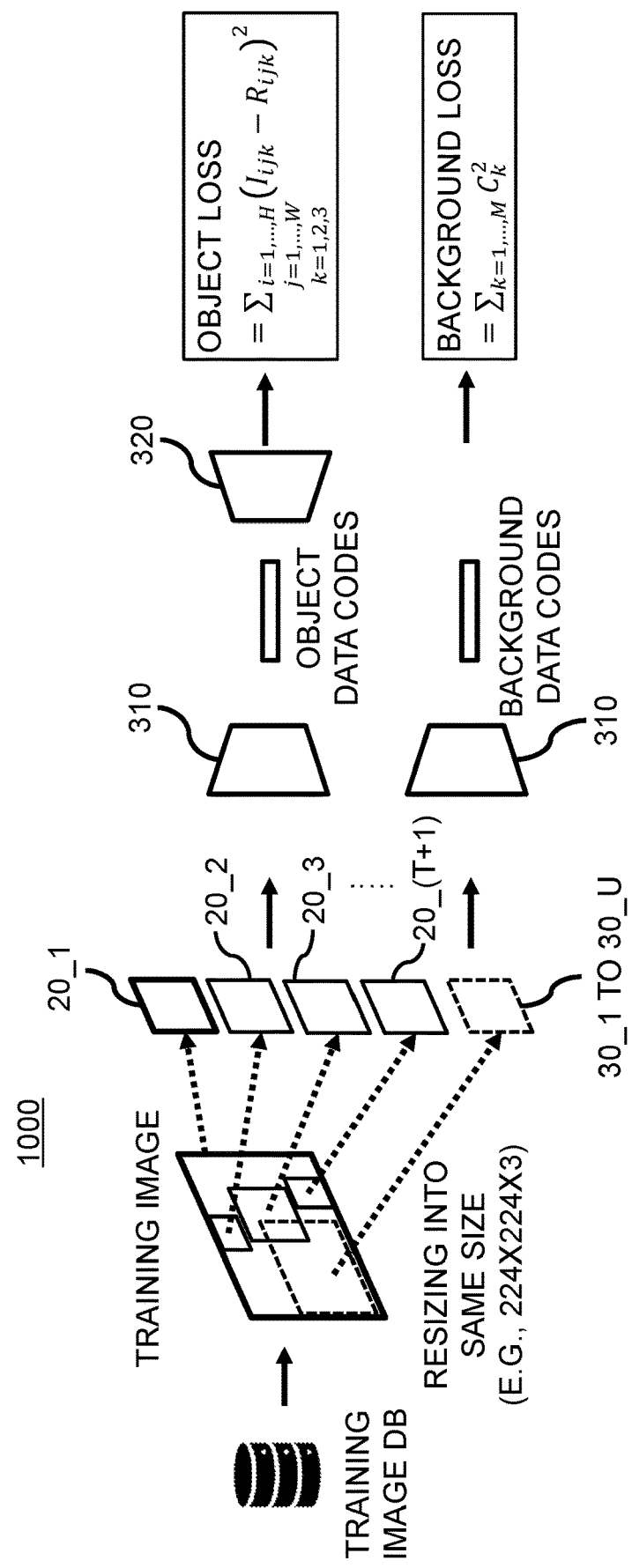
FIG. 6 is a drawing schematically illustrating processes of training a data encoder in accordance with one example embodiment of the present disclosure.

First, by referring to FIG. 6, processes of training the data encoder 310 are described as follows.

The active learning device 1000 may sample the training images to be used for training the data encoder 310 from a training image database (DB) which stores the training images for training the target model, i.e., the object detector.

And the active learning device 1000 may perform or support another device to perform (i) a process of cropping one or more object regions in each of the training images, sampled from the training image database to be used for training the object detector, to thereby generate first cropped object images for training to t-th cropped object images for training and (ii) a process of cropping background regions in each of the training images, to thereby generate first cropped background images for training to u-th cropped background images for training. Herein, each of t and u may be an integer equal to or greater than 1.

Herein, the background regions may be randomly cropped so that the number of the cropped background images is one to three times the number of the cropped object images.

Thereafter, the active learning device 1000 may perform or support another device to perform a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training $20\_1$ to (t+1)-th resized object images for training $20\_(t+1)$ and (2) first resized background images for training $30\_1$ to u-th resized background images for training $30\_u$.

Then, the active learning device 1000 may perform or support another device to perform a process of inputting the first resized object images for training $20\_1$ to the (t+1)-th resized object images for training $20\_(t+1)$ and the first resized background images for training $30\_1$ to the u-th resized background images for training 30_u into the data encoder 310 of a data autoencoder, to thereby allow the data encoder 310 to encode the first resized object images for training 20_1 to the (t+1)-th resized object images for training 20_(t+1) and the first resized background images for training 30_1 to the u-th resized background images for training 30_u, and thus to output (1) first object data codes for training to (t+1)-th object data codes for training respectively corresponding to the first resized object images for training 20_1 to the (t+1)-th resized object images for training 20_(t+1) and (2) first background data codes for training to u-th background data codes for training respectively corresponding to the first resized background images for training 30_1 to the u-th resized background images for training 30_u.

Thereafter, the active learning device 1000 may perform or support another device to perform a process of inputting the first object data codes for training to the (t+1)-th object data codes for training into a data decoder 320 of the data autoencoder, to thereby allow the data decoder 320 to decode the first object data codes for training to the (t+1)-th object data codes for training and thus to output first reconstructed images for training to (t+1)-th reconstructed images for training.

And the active learning device 1000 may perform or support another device to perform (i) a process of training the data decoder 320 and the data encoder 310 by using one or more first object losses to one or more (t+1)-th object losses calculated by referring to the first resized object images for training to the (t+1)-th resized object images for training and the first reconstructed images for training to the (t+1)-th reconstructed images for training and (ii) a process of training the data encoder 310 by using one or more background losses calculated by referring to the first background data codes for training to the u-th background data codes for training.

Herein, the object losses may be calculated as follows.

$$\text{object loss} = \sum_{\substack{i=1,\ldots,H \\ j=1,\ldots,W \\ k=1,2,3}} (I_{ijk} - R_{ijk})^2$$

Also, the background losses may be calculated as follows.

$$\text{background loss} = \sum_{k=1,\ldots,M} C_k^2$$

That is, the active learning device 1000 may (i) allow a whole image and objects thereon to be reflected on reconstruction losses and thus to be used for training the data decoder 320 and the data encoder 310 and (ii) allow the background to be not reflected on the reconstruction losses and to be reflected, as the data codes of all zeros, on code losses and thus to be used for training the data encoder 310.

Meanwhile, the active learning device 1000 is described above as training the data encoder 310, however, as another example, a separate learning device may be used for training the data encoder 310.

Figure 7:
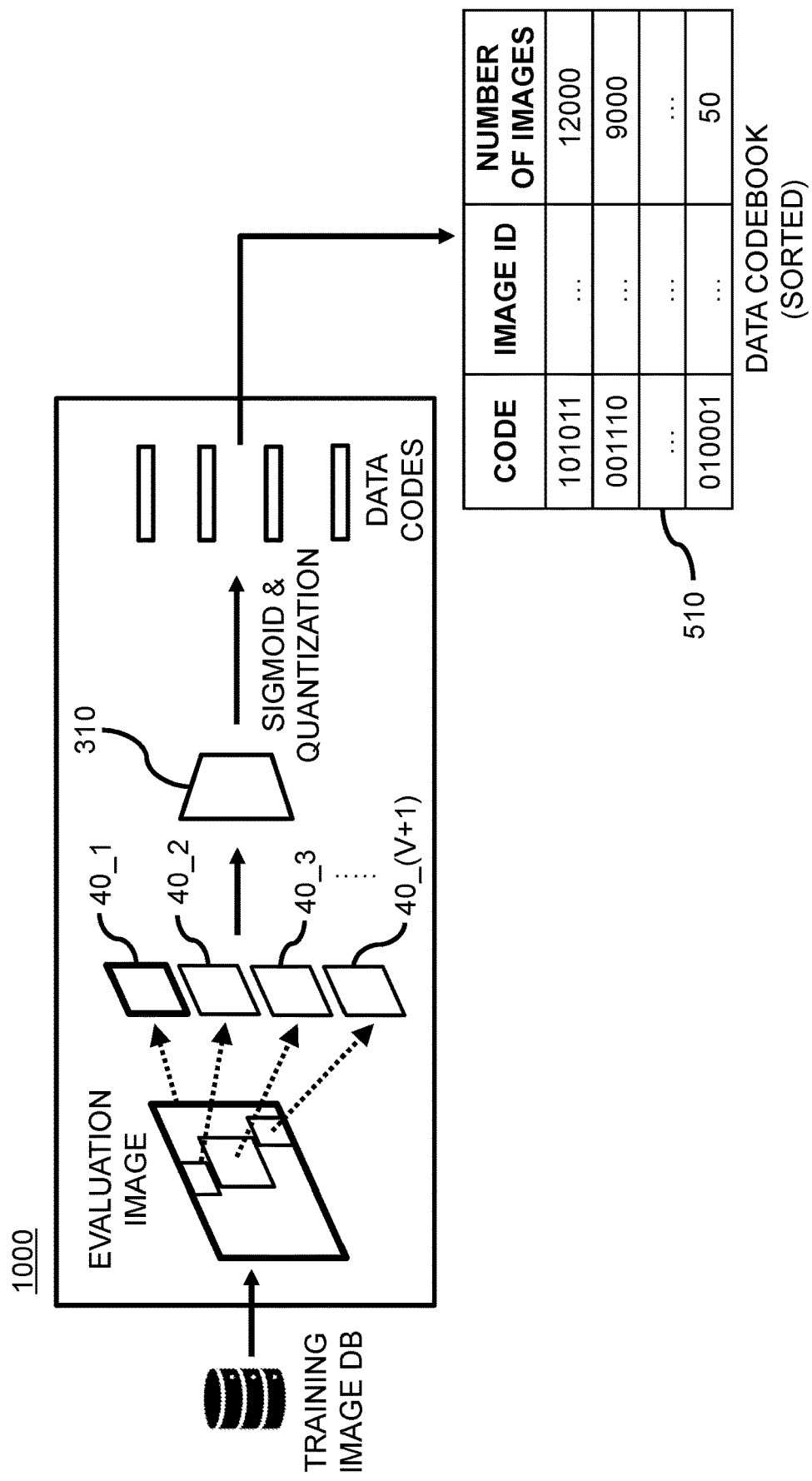
FIG. 7 is a drawing schematically illustrating processes of generating the data codebook in accordance with one example embodiment of the present disclosure.

Next, by referring to FIG. 7, processes of creating the data codebook are described as follows.

The active learning device 1000 may sample the evaluation images, to be used for creating the data codebook, from the training image database which stores the training images for training the target model, i.e., the object detector.

Herein, the active learning device 1000 may sample the training images from the training image database, and may divide the sampled training images into (1) the training images to be used for training the data encoder 310 and (2) the evaluation images to be used for creating the data codebook. And, the division into the training images and the evaluation images may be performed by using uniform random sampling, such that each of distribution characteristics of the training images and the evaluation images, that is, each rareness of each subspace, is not different from each other.

And the active learning device 1000 may perform or support another device to perform (i) a process of cropping the object regions in each of the evaluation images sampled from the training image database, to thereby generate first cropped object images for evaluation to v-th cropped object images for evaluation and (ii) a process of resizing (1) each of the evaluation images and (2) the first cropped object images for evaluation to the v-th cropped object images for evaluation corresponding to each of the evaluation images into a same size, to thereby generate first resized object images for evaluation 40_1 to (v+1)-th resized object images for evaluation 40_(v+1).

Then the active learning device 1000 may perform or support another device to perform a process of inputting the first resized object images for evaluation 40_1 to the (v+1)-th resized object images for evaluation 40_(v+1) into the data encoder 310, to thereby allow the data encoder 310 to encode the first resized object images for evaluation 40_1 to the (v+1)-th resized object images for evaluation 40_(v+1) and thus to output first object data codes for evaluation to (v+1)-th object data codes for evaluation respectively corresponding to the first resized object images for evaluation 40_1 to the (v+1)-th resized object images for evaluation 40_(v+1).

And the active learning device 1000 may perform or support another device to perform (i) a process of sorting the first object data codes for evaluation to the (v+1)-th object data codes for evaluation by the data codes and (ii) a process of counting the number of the resized images corresponding to each of the data codes to thereby generate the data codebook 510. That is, the number of the resized images per data code may be mapped into each of the data codes, to thereby generate the data codebook 510. Herein, the data codebook 510 may further include the image IDs mapped into the data codes.

Meanwhile, the active learning device 1000 is described above as creating the data codebook 510, however, as another example, a separate learning device or a separate device for creating the data codebook may be used for creating the data codebook 510.

Figure 8:
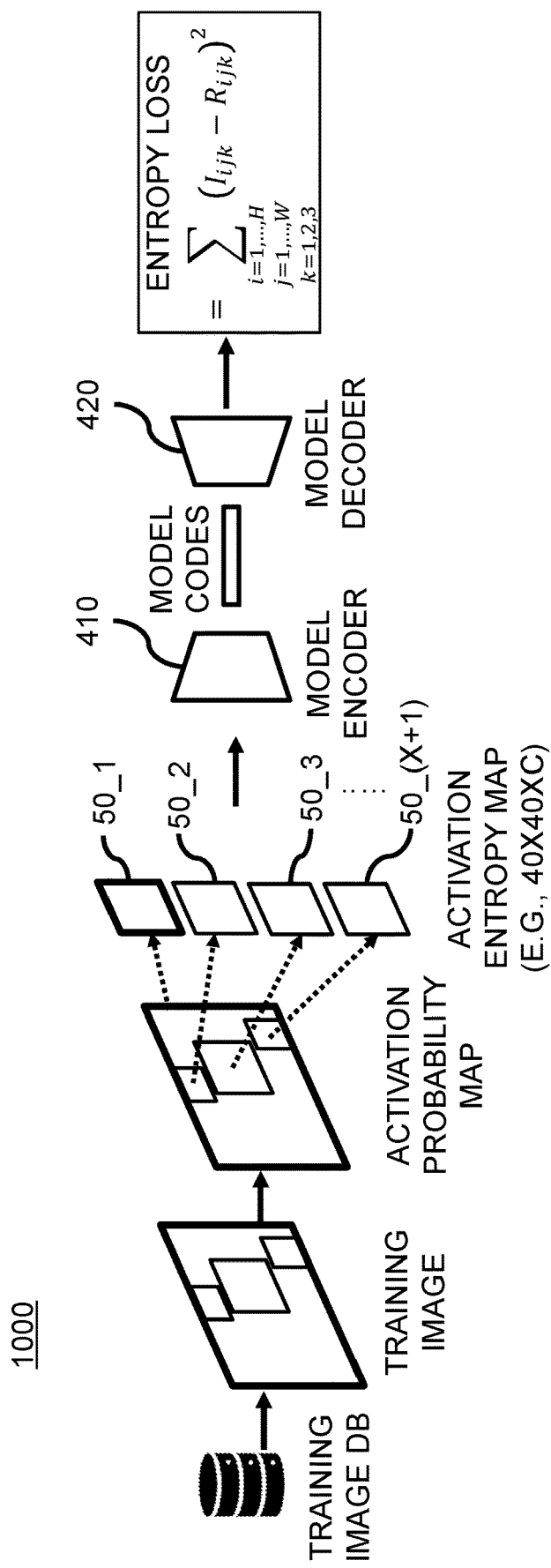
FIG. 8 is a drawing schematically illustrating processes of training a model encoder in accordance with one example embodiment of the present disclosure.

Next, by referring to FIG. 8, processes of training the model encoder 410 are described as follows.

The active learning device 1000 may sample the training images to be used for training the data encoder 310 from the training image database which stores the training images for training the target model, i.e., the object detector.

And the active learning device 1000 may perform or support another device to perform (i) a process of inputting the training images, sampled from the training image database to be used for training the object detector, into the object detector 200, to thereby allow the object detector 200 to apply m times of the Monte Carlo dropouts to each of the training images and thus to generate first feature maps for training to m-th feature maps for training corresponding to each of the training images and (ii) a process of applying the Bayesian output embedding operation to the first feature maps for training to the m-th feature maps for training, to thereby generate activation entropy maps for training.

Herein, training of the model encoder 410 does not use the background, unlike training of the data encoder 310. This is because determination of the background by the data encoder based on images may be more accurate than determination of the background by the model encoder using an activation entropy.

Thereafter, the active learning device 1000 may perform or support another device to perform (i) a process of cropping one or more regions, corresponding to one or more objects for training, in each of the activation entropy maps for training, to thereby generate first cropped activation entropy maps for training to x-th cropped activation entropy maps for training and (ii) a process of resizing (1) each of the activation entropy maps for training and (2) the first cropped activation entropy maps for training to the x-th cropped activation entropy maps for training corresponding to each of the activation entropy maps for training into a same size, to thereby generate first resized activation entropy maps for training 50_1 to (x+1)-th resized activation entropy maps for training 50_(x+1). Herein, x may be an integer equal to or greater than 1.

Meanwhile, the activation entropy maps for training are created and then their object regions are cropped as in the above description, however, as another example, the object regions may be cropped and then cropped images may be used for creating the activation entropy maps for training.

That is, the active learning device 1000 may perform or support another device to perform a process of inputting each of first resized object images for training to (x+1)-th resized object images for training, created by resizing each of the training images and cropped object images for training to a same size, into the object detector 200, to thereby allow the object detector 200 to apply m times of the Monte Carlo dropouts to each of the first resized object images for training to the (x+1)-th resized object images for training and thus to generate first object feature maps for training to m-th object feature maps for training corresponding to each of the first resized object images for training to the (x+1)-th resized object images for training. Herein, each group, comprised of each first object feature map for training to each m-th object feature map for training, may be generated for each resized object image for training. Further, the cropped object images for training may be created by cropping one or more object regions in each of the training images. And the active learning device 1000 may perform or support another device to perform a process of applying the Bayesian output embedding operation to the first object feature maps for training to the m-th object feature maps for training, to thereby generate the first resized activation entropy maps for training 50_1 to the (x+1)-th resized activation entropy maps for training 50_(x+1) respectively corresponding to the first resized object images for training to the (x+1)-th resized object images for training.

And the active learning device 1000 may perform or support another device to perform a process of inputting the first resized activation entropy maps for training 50_1 to the (x+1)-th resized activation entropy maps for training 50_(x+1) into the model encoder 410 of the model autoencoder, to thereby allow the model encoder 410 to encode the first resized activation entropy maps for training 50_1 to the (x+1)-th resized activation entropy maps for training 50_(x+1) and thus to output first model codes for training to (x+1)-th model codes for training corresponding to the first resized activation entropy maps for training 50_1 to the (x+1)-th resized activation entropy maps for training 50_(x+1).

Thereafter, the active learning device 1000 may perform or support another device to perform a process of inputting the first model codes for training to the (x+1)-th model codes for training into a model decoder 420 of the model autoencoder, to thereby allow the model decoder 420 to decode the first model codes for training to the (x+1)-th model codes for training and thus to output first reconstructed entropy maps for training to (x+1)-th reconstructed entropy maps for training.

Thereafter, the active learning device 1000 may perform or support another device to perform a process of training the model decoder 420 and the model encoder 410 using one or more first entropy losses to one or more (x+1)-th entropy losses which are calculated by referring to (1) the first resized activation entropy maps for training to the (x+1)-th resized activation entropy maps for training and (2) the first reconstructed entropy maps for training to the (x+1)-th reconstructed entropy maps for training.

Herein, the entropy losses may be calculated as follows.

$$\text{entropy loss} = \sum_{\substack{i=1,\ldots,H \\ j=1,\ldots,W \\ k=1,2,3}} (I_{ijk} - R_{ijk})^2$$

Meanwhile, since the activation entropy maps are smaller than the training images, the whole image and the cropped object images for training may be resized into a same size to train the data encoder 310 such that said same size is larger than sizes of the images to be used for training the data encoder 310.

Herein, each time the object detector 200 is trained and re-trained, the model encoder 410 may also be trained.

Also, the active learning device 1000 is described above as training the model encoder 410, however, as another example, a separate learning device may be used for training the model encoder 410.

Next, by referring to FIG. 9, processes of creating the model codebook are described as follows.

The active learning device 1000 may sample the evaluation images, i.e., the images for evaluation, to be used for creating the model codebook from the training image database which stores the training images for training the target model, i.e., the object detector.

Herein, the active learning device 1000 may sample the training images from the training image database, and may divide the sampled training images into (1) the training images to be used for training the model encoder 410 and (2) the evaluation images to be used for creating the model codebook. And, such a division into the training images and the evaluation images may be performed by using the uniform random sampling.

And the active learning device 1000 may perform or support another device to perform (i) a process of inputting the evaluation images, sampled from the training image database, into the object detector 200, to thereby allow the object detector 200 to apply m times of the Monte Carlo dropouts to each of the evaluation images and thus to generate first feature maps for evaluation to m-th feature maps for evaluation corresponding to each of the evaluation images and (ii) a process of applying the Bayesian output embedding operation to the first feature maps for evaluation to the m-th feature maps for evaluation, to thereby generate activation entropy maps for evaluation.

Thereafter, the active learning device 1000 may perform or support another device to perform (i) a process of cropping one or more regions, corresponding to one or more objects for evaluation, in each of the activation entropy maps for evaluation, to thereby generate first cropped activation entropy maps for evaluation to y-th cropped activation entropy maps for evaluation and (ii) a process of resizing (1) each of the activation entropy maps for evaluation and (2) the first cropped activation entropy maps for evaluation to the y-th cropped activation entropy maps for evaluation corresponding to each of the activation entropy maps for evaluation into a same size, to thereby generate first resized activation entropy maps for evaluation 60_1 to (y+1)-th resized activation entropy maps for evaluation 60_(y+1). Herein, y may be an integer equal to or greater than 1.

Meanwhile, the activation entropy maps for evaluation are created and then their object regions are cropped as in the above description, however, as another example, the object regions may be cropped and then cropped images may be used for creating the activation entropy maps for evaluation.

That is, the active learning device 1000 may perform or support another device to perform a process of inputting each of first resized object images for evaluation to (y+1)-th resized object images for evaluation, created by resizing each of the evaluation images and cropped object images for evaluation to a same size, into the object detector 200, to thereby allow the object detector 200 to apply m times of the Monte Carlo dropouts to each of the first resized object images for evaluation to the (y+1)-th resized object images for evaluation and thus to generate first object feature maps for evaluation to m-th object feature maps for evaluation corresponding to each of the first resized object images for evaluation to the (y+1)-th resized object images for evaluation. Herein, each group, comprised of each first object feature map for evaluation to each m-th object feature map for evaluation, may be generated for each resized object image for evaluation. And the active learning device 1000 may perform or support another device to perform a process of applying the Bayesian output embedding operation to the first object feature maps for evaluation to the m-th object feature maps for evaluation, to thereby generate the first resized activation entropy maps for evaluation 60_1 to the (y+1)-th resized activation entropy maps for evaluation 60_(y+1) respectively corresponding to the first resized object images for evaluation to the (y+1)-th resized object images for evaluation.

And the active learning device 1000 may perform or support another device to perform a process of inputting the first resized activation entropy maps for evaluation 60_1 to the (y+1)-th resized activation entropy maps for evaluation 60_(y+1) into the model encoder 410 of the model autoencoder, to thereby allow the model encoder 410 to encode the first resized activation entropy maps for evaluation 60_1 to the (y+1)-th resized activation entropy maps for evaluation 60_(y+1) and thus to output first model codes for evaluation to (y+1)-th model codes for evaluation corresponding to the first resized activation entropy maps for evaluation 60_1 to the (y+1)-th resized activation entropy maps for evaluation 60_(y+1).

Thereafter, the active learning device 1000 may perform or support another device to perform (i) a process of sorting the first model codes for evaluation to the (y+1)-th model codes for evaluation by the model codes and (ii) a process of generating the model codebook 520 by referring to each of the average entropy values of each of the resized activation entropy maps corresponding to each of the model codes.

That is, the active learning device 1000 may average over each of the entropy values of each of the resized activation entropy maps corresponding to each of the model codes, to thereby generate the average entropy values, and match each of the average entropy values with each of the model codes, to thereby generate the model codebook 520. Herein, the model codebook 520 may further include the image IDs mapped into the model codes.

And, the active learning device 1000 is described above as creating the model codebook 520, however, as another example, a separate learning device or a separate device for creating the model codebook may be used for creating the model codebook 520.

The present disclosure has an effect of easily acquiring the rare samples according to types of the objects by mapping of feature space using the object detector and the Bayesian dual autoencoder together in the active learning.

The present disclosure has another effect of acquiring the rare samples on which information on whether an object of a specific type appears and information on characteristics of a whole scene are reflected according to types of objects by mapping of the feature space using the object detector and the Bayesian dual autoencoder together in the active learning.

The present disclosure has still another effect of easily confirming the reasons the rare samples are selected by mapping and encoding the feature space using the object detector and the Bayesian dual autoencoder together in the active learning.

The present disclosure has still yet another effect of easily selecting image samples only of specific types by mapping and encoding the feature space using the object detector and the Bayesian dual autoencoder together in the active learning.

It is still yet another object of the present disclosure to easily acquire the rare samples from a perspective of data distribution and the hard samples from a perspective of a model in the active learning.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for explainable active learning, to be used for an object detector, by using a Bayesian dual encoder, comprising steps of:
   (a) if one or more test images are acquired, an active learning device performing or supporting another device to perform (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing corresponding to each of the test images into a same size, to thereby generate first resized images for testing to (n+1)-th resized images for testing, and (iv) a process of inputting the first resized images for testing to the (n+1)-th resized images for testing into a data encoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing;
   (b) the active learning device performing or supporting another device to perform (b1) one of (i) (i-1) a process of inputting the test images into the object detector, to thereby allow the object detector to apply m times of Monte Carlo dropouts to each of the test images and thus to generate first feature maps for testing to m-th feature maps for testing corresponding to each of the test images wherein m is an integer equal to or greater than 2, (i-2) a process of applying Bayesian output embedding operation to the first feature maps for testing to the m-th feature maps for testing, to thereby generate activation entropy maps for testing respectively corresponding to the test images, (i-3) a process of cropping one or more regions, corresponding to specific bounding boxes for testing determined as respectively enclosing the objects for testing among the bounding boxes for testing, in each of the activation entropy maps for testing, to thereby generate first cropped activation entropy maps for testing to o-th cropped activation entropy maps for testing wherein o is an integer equal to or less than n and (i-4) a process of resizing (1) each of the activation entropy maps for testing and (2) the first cropped activation entropy maps for testing to the o-th cropped activation entropy maps for testing corresponding to each of the activation entropy maps for testing into a same size, to thereby generate first resized activation entropy maps for testing to (o+1)-th resized activation entropy maps for testing, and (ii) (ii-1) a process of inputting first resized object images for testing to (o+1)-th resized object images for testing, determined as the objects for testing, among the first resized images for testing to the (n+1)-th resized images for testing into the object detector, to thereby allow the object detector to apply m times of the Monte Carlo dropouts to each of the first resized object images for testing to the (o+1)-th resized object images for testing and thus to generate first object feature maps for testing to m-th object feature maps for testing corresponding to each of the first resized object images for testing to the (o+1)-th resized object images for testing and (ii-2) a process of applying the Bayesian output embedding operation to the first feature maps for testing to the m-th feature maps for testing, to thereby generate the first resized activation entropy maps for testing to the (o+1)-th resized activation entropy maps for testing respectively corresponding to the first resized object images for testing to the (o+1)-th resized object images for testing and (b2) a process of inputting the first resized activation entropy maps for testing to the (o+1)-th resized activation entropy maps for testing into a model encoder, to thereby allow the model encoder to encode the first resized activation entropy maps for testing to the (o+1)-th resized activation entropy maps for testing and thus to output first model codes for testing to (o+1)-th model codes for testing corresponding to the first resized activation entropy maps for testing to the (o+1)-th resized activation entropy maps for testing; and
   (c) the active learning device performing or supporting another device to perform (i) (i-1) a process of confirming reference data codes corresponding to the number of the resized images equal to or less than a counter threshold by referring to a data codebook, wherein the data codebook is created by referring to previous training images used for pre-training the object detector and wherein the data codebook lists the number of the resized images per data code, (i-2) a process of extracting first specific data codes, respectively corresponding to the reference data codes, from the first data codes for testing to the (n+1)-th data codes for testing, (i-3) a process of selecting first specific test images, corresponding to the first specific data codes, as rare samples to be used for re-training the object detector, and (i-4) a process of updating the data codebook by referring to second specific data codes corresponding to the rare samples, and (ii) (ii-1) a process of confirming reference model codes, corresponding to average entropy values equal to or greater than an entropy threshold, by referring to a model codebook, wherein the model codebook is created by referring to evaluation images before re-training the object detector and wherein the model codebook lists the average entropy values in the resized activation entropy maps per model code of the evaluation images, (ii-2) a process of extracting specific model codes, corresponding to the reference model codes, from the first model codes for testing to the (o+1)-th model codes for testing, and (ii-3) a process of selecting second specific test images, corresponding to the specific model codes, as hard samples to be used for re-training the object detector.

2. The method of claim 1, further comprising a step of:
   (d) the active learning device performing or supporting another device to perform a process of re-training the object detector by using the previous training images, the rare samples, and the hard samples.

3. The method of claim 1, wherein, at the step of (b), the active learning device performs or supports another device to perform one of (i) (i-1) a process of applying binary conversion to the first feature maps for testing to the m-th feature maps for testing, to thereby generate first binary feature maps for testing to m-th binary feature maps for testing, (i-2) a process of concatenating the first binary feature maps for testing to the m-th binary feature maps for testing, to thereby generate activation probability maps for testing, and (i-3) a process of generating the activation entropy maps for testing by referring to the activation probability maps for testing respectively corresponding to the test images, and (ii) (ii-1) a process of applying the binary conversion to first object feature maps for testing to m-th object feature maps for testing respectively corresponding to the first resized object images for testing to the (o+1)-th resized object images for testing, to thereby generate first binary object feature maps for testing to m-th binary object feature maps for testing respectively corresponding to the first resized object images for testing to the (o+1)-th resized object images for testing, (ii-2) a process of concatenating the first binary object feature maps for testing to the m-th binary object feature maps for testing, respectively corresponding to the first resized object images for testing to the (o+1)-th resized object images for testing, to thereby generate first object activation probability maps for testing to (o+1)-th object activation probability maps for testing respectively corresponding to the first resized object images for testing to the (o+1)-th resized object images for testing, and (ii-3) a process of generating the first resized activation entropy maps for testing to the (o+1)-th resized activation entropy maps for testing by referring to the first object activation probability maps for testing to the (o+1)-th object activation probability maps for testing.

4. The method of claim 1, wherein, at the step of (a), the active learning device performs or supports another device to perform a process of mapping mis-detected bounding boxes for testing, among the bounding boxes for testing, into background data codes.

5. The method of claim 1, wherein, at the step of (c), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1, and
wherein the entropy threshold is one of (1) a predetermined average entropy value and (2) one among the average entropy values which corresponds to a threshold model code at an s-th position, within the model codebook, counted in an order from a largest average entropy value to a smallest average entropy value wherein s is an integer equal to or greater than 1.

6. The method of claim 1, before the step of (a), further comprising a step of:
(a1) the active learning device performing or supporting another device to perform (i) a process of cropping one or more object regions in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, (iv) a process of inputting the first resized object images for training to the (t+1)-th resized object images for training and the first resized background images for training to the u-th resized background images for training into the data encoder of a data autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training, (v) a process of inputting the first object data codes for training to the (t+1)-th object data codes for training into a data decoder of the data autoencoder, to thereby allow the data decoder to decode the first object data codes for training to the (t+1)-th object data codes for training and thus to output first reconstructed images for training to (t+1)-th reconstructed images for training, and (vi) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training and a process of training the data encoder by using one or more background losses calculated by referring to the first background data codes for training to the u-th background data codes for training.

7. The method of claim 6, further comprising a step of:
(a2) the active learning device performing or supporting another device to perform (i) a process of cropping the object regions in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

8. The method of claim 1, before the step of (a), further comprising a step of:
(a3) the active learning device performing or supporting another device to perform (i) one of (i-1) (i-1-a) a process of inputting training images, sampled from a training image database to be used for training the object detector, into the object detector, to thereby allow the object detector to apply m times of the Monte Carlo dropouts to each of the training images and thus to generate first feature maps for training to m-th feature maps for training corresponding to each of the training images, (i-1-b) a process of applying the Bayesian output embedding operation to the first feature maps for training to the m-th feature maps for training, to thereby generate activation entropy maps for training, (i-1-c) a process of cropping one or more regions, corresponding to one or more objects for training, in each of the activation entropy maps for training, to thereby generate first cropped activation entropy maps for training to x-th cropped activation entropy maps for training wherein x is an integer equal to or greater than 1, and (i-1-d) a process of resizing (1) each of the activation entropy maps for training and (2) the first cropped activation entropy maps for training to the x-th cropped activation entropy maps for training corresponding to each of the activation entropy maps for training into a same size, to thereby generate first resized activation entropy maps for training to (x+1)-th resized activation entropy maps for training, and (i-2) (i-2-a) a process of inputting each of first resized object images for training to (x+1)-th resized object images for training, created by resizing each of the training images and cropped object images for training to a same size wherein the cropped object images for training are created by cropping one or more object regions in each of the training images, into the object detector, to thereby allow the object detector to apply m times of the Monte Carlo dropouts to each of the first resized object images for training to the (x+1)-th resized object images for training and thus to generate first object feature maps for training to m-th object feature maps for training corresponding to each of the first resized object images for training to the (x+1)-th resized object images for training, (i-2-b) a process of applying the Bayesian output embedding operation to the first object feature maps for training to the m-th object feature maps for training, to thereby generate the first resized activation entropy maps for training to the (x+1)-th resized activation entropy maps for training respectively corresponding to the first resized object images for training to the (x+1)-th resized object images for training, (ii) a process of inputting the first resized activation entropy maps for training to the (x+1)-th resized activation entropy maps for training into the model encoder of a model autoencoder, to thereby allow the model encoder to encode the first resized activation entropy maps for training to the (x+1)-th resized activation entropy maps for training and thus to output first model codes for training to (x+1)-th model codes for training corresponding to the first resized activation entropy maps for training to the (x+1)-th resized activation entropy maps for training, (iii) a process of inputting the first model codes for training to the (x+1)-th model codes for training into a model decoder of the model autoencoder, to thereby allow the model decoder to decode the first model codes for training to the (x+1)-th model codes for training and thus to output first reconstructed entropy maps for training to (x+1)-th reconstructed entropy maps for training, (iv) a process of training the model decoder and the model encoder using one or more first entropy losses to one or more (x+1)-th entropy losses calculated by referring to the first resized activation entropy maps for training to the (x+1)-th resized activation entropy maps for training and the first reconstructed entropy maps for training to the (x+1)-th reconstructed entropy maps for training.

9. The method of claim 8, further comprising a step of:
(a4) the active learning device performing or supporting another device to perform (i) one of (i-1) (i-1-a) a process of inputting the evaluation images, sampled from the training image database, into the object detector, to thereby allow the object detector to apply m times of the Monte Carlo dropouts to each of the evaluation images and thus to generate first feature maps for evaluation to m-th feature maps for evaluation corresponding to each of the evaluation images, (i-1-b) a process of applying the Bayesian output embedding operation to the first feature maps for evaluation to the m-th feature maps for evaluation, to thereby generate activation entropy maps for evaluation, (i-1-c) a process of cropping one or more regions, corresponding to one or more objects for evaluation, in each of the activation entropy maps for evaluation, to thereby generate first cropped activation entropy maps for evaluation to y-th cropped activation entropy maps for evaluation wherein y is an integer equal to or greater than 1, and (i-1-d) a process of resizing (1) each of the activation entropy maps for evaluation and (2) the first cropped activation entropy maps for evaluation to the y-th cropped activation entropy maps for evaluation corresponding to each of the activation entropy maps for evaluation into a same size, to thereby generate first resized activation entropy maps for evaluation to (y+1)-th resized activation entropy maps for evaluation, and (i-2) (i-2-a) a process of inputting each of first resized object images for evaluation to (y+1)-th resized object images for evaluation, created by resizing each of the evaluation images and cropped object images for evaluation to a same size wherein the cropped object images for evaluation are created by cropping the object regions in the evaluation images, into the object detector, to thereby allow the object detector to apply m times of the Monte Carlo dropouts to each of the first resized object images for evaluation to the (y+1)-th resized object images for evaluation and thus to generate first object feature maps for evaluation to m-th object feature maps for evaluation corresponding to each of the first resized object images for evaluation to the (y+1)-th resized object images for evaluation, (i-2-b) a process of applying the Bayesian output embedding operation to the first object feature maps for evaluation to the m-th object feature maps for evaluation, to thereby generate the first resized activation entropy maps for evaluation to the (y+1)-th resized activation entropy maps for evaluation respectively corresponding to the first resized object images for evaluation to the (y+1)-th resized object images for evaluation, (ii) a process of inputting the first resized activation entropy maps for evaluation to the (y+1)-th resized activation entropy maps for evaluation into the model encoder of the model autoencoder, to thereby allow the model encoder to encode the first resized activation entropy maps for evaluation to the (y+1)-th resized activation entropy maps for evaluation and thus to output first model codes for evaluation to (y+1)-th model codes for evaluation corresponding to the first resized activation entropy maps for evaluation to the (y+1)-th resized activation entropy maps for evaluation, and (iii) a process of sorting the first model codes for evaluation to the (y+1)-th model codes for evaluation by the model codes and a process of generating the model codebook by referring to the average entropy values of the resized activation entropy maps corresponding to each of the model codes.

10. The method of claim 9, wherein, each time the object detector is trained and re-trained, the active learning device performs or supports another device to perform a process of training the model encoder and a process of generating the model cookbook.

11. An active learning device for explainable active learning, to be used for an object detector, by using a Bayesian dual encoder, comprising:
at least one memory that stores instructions; and
at least one processor configured to execute the instructions to perform or support another device to perform: (I) if one or more test images are acquired, (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing corresponding to each of the test images into a same size, to thereby generate first resized images for testing to (n+1)-th resized images for testing, and (iv) a process of inputting the first resized images for testing to the (n+1)-th resized images for testing into a data encoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing, (II) (II-1) one of (i) (i-1) a process of inputting the test images into the object detector, to thereby allow the object detector to apply m times of Monte Carlo dropouts to each of the test images and thus to generate first feature maps for testing to m-th feature maps for testing corresponding to each of the test images wherein m is an integer equal to or greater than 2, (i-2) a process of applying Bayesian output embedding operation to the first feature maps for testing to the m-th feature maps for testing, to thereby generate activation entropy maps for testing respectively corresponding to the test images, (i-3) a process of cropping one or more regions, corresponding to specific bounding boxes for testing determined as respectively enclosing the objects for testing among the bounding boxes for testing, in each of the activation entropy maps for testing, to thereby generate first cropped activation entropy maps for testing to o-th cropped activation entropy maps for testing wherein o is an integer equal to or less than n and (i-4) a process of resizing (1) each of the activation entropy maps for testing and (2) the first cropped activation entropy maps for testing to the o-th cropped activation entropy maps for testing corresponding to each of the activation entropy maps for testing into a same size, to thereby generate first resized activation entropy maps for testing to (o+1)-th resized activation entropy maps for testing, and (ii) (ii-1) a process of inputting first resized object images for testing to (o+1)-th resized object images for testing, determined as the objects for testing, among the first resized images for testing to the (n+1)-th resized images for testing into the object detector, to thereby allow the object detector to apply m times of the Monte Carlo dropouts to each of the first resized object images for testing to the (o+1)-th resized object images for testing and thus to generate first object feature maps for testing to m-th object feature maps for testing corresponding to each of the first resized object images for testing to the (o+1)-th resized object images for testing and (ii-2) a process of applying the Bayesian output embedding operation to the first feature maps for testing to the m-th feature maps for testing, to thereby generate the first resized activation entropy maps for testing to the (o+1)-th resized activation entropy maps for testing respectively corresponding to the first resized object images for testing to the (o+1)-th resized object images for testing and (II-2) a process of inputting the first resized activation entropy maps for testing to the (o+1)-th resized activation entropy maps for testing into a model encoder, to thereby allow the model encoder to encode the first resized activation entropy maps for testing to the (o+1)-th resized activation entropy maps for testing and thus to output first model codes for testing to (o+1)-th model codes for testing corresponding to the first resized activation entropy maps for testing to the (o+1)-th resized activation entropy maps for testing, and (III) (i) (i-1) a process of confirming reference data codes corresponding to the number of the resized images equal to or less than a counter threshold by referring to a data codebook, wherein the data codebook is created by referring to previous training images used for pre-training the object detector and wherein the data codebook lists the number of the resized images per data code, (i-2) a process of extracting first specific data codes, respectively corresponding to the reference data codes, from the first data codes for testing to the (n+1)-th data codes for testing, (i-3) a process of selecting first specific test images, corresponding to the first specific data codes, as rare samples to be used for re-training the object detector, and (i-4) a process of updating the data codebook by referring to second specific data codes corresponding to the rare samples, and (ii) (ii-1) a process of confirming reference model codes, corresponding to average entropy values equal to or greater than an entropy threshold, by referring to a model codebook, wherein the model codebook is created by referring to evaluation images before re-training the object detector and wherein the model codebook lists the average entropy values in the resized activation entropy maps per model code of the evaluation images, (ii-2) a process of extracting specific model codes, corresponding to the reference model codes, from the first model codes for testing to the (o+1)-th model codes for testing, and (ii-3) a process of selecting second specific test images, corresponding to the specific model codes, as hard samples to be used for re-training the object detector.

12. The active learning device of claim 11, wherein the processor further performs:
(IV) a process of re-training the object detector by using the previous training images, the rare samples, and the hard samples.

13. The active learning device of claim 11, wherein, at the process of (II), the processor performs or supports another device to perform one of (i) (i-1) a process of applying binary conversion to the first feature maps for testing to the m-th feature maps for testing, to thereby generate first binary feature maps for testing to m-th binary feature maps for testing, (i-2) a process of concatenating the first binary feature maps for testing to the m-th binary feature maps for testing, to thereby generate activation probability maps for testing, and (i-3) a process of generating the activation entropy maps for testing by referring to the activation probability maps for testing respectively corresponding to the test images, and (ii) (ii-1) a process of applying the binary conversion to first object feature maps for testing to m-th object feature maps for testing respectively corresponding to the first resized object images for testing to the (o+1)-th resized object images for testing, to thereby generate first binary object feature maps for testing to m-th binary object feature maps for testing respectively corresponding to the first resized object images for testing to the (o+1)-th resized object images for testing, (ii-2) a process of concatenating the first binary object feature maps for testing to the m-th binary object feature maps for testing, respectively corresponding to the first resized object images for testing to the (o+1)-th resized object images for testing, to thereby generate first object activation probability maps for testing to (o+1)-th object activation probability maps for testing respectively corresponding to the first resized object images for testing to the (o+1)-th resized object images for testing, and (ii-3) a process of generating the first resized activation entropy maps for testing to the (o+1)-th resized activation entropy maps for testing by referring to the first object activation probability maps for testing to the (o+1)-th object activation probability maps for testing.

14. The active learning device of claim 11, wherein, at the process of (I), the processor performs or supports another device to perform a process of mapping mis-detected bounding boxes for testing, among the bounding boxes for testing, into background data codes.

15. The active learning device of claim 11, wherein, at the process of (III), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1, and
wherein the entropy threshold is one of (1) a predetermined average entropy value and (2) one among the average entropy values which corresponds to a threshold model code at an s-th position, within the model codebook, counted in an order from a largest average entropy value to a smallest average entropy value wherein s is an integer equal to or greater than 1.

16. The active learning device of claim 11, before the process of (I), the processor further performs:

(I1) (i) a process of cropping one or more object regions in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, (iv) a process of inputting the first resized object images for training to the (t+1)-th resized object images for training and the first resized background images for training to the u-th resized background images for training into the data encoder of a data autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training, (v) a process of inputting the first object data codes for training to the (t+1)-th object data codes for training into a data decoder of the data autoencoder, to thereby allow the data decoder to decode the first object data codes for training to the (t+1)-th object data codes for training and thus to output first reconstructed images for training to (t+1)-th reconstructed images for training, and (vi) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training and a process of training the data encoder by using one or more background losses calculated by referring to the first background data codes for training to the u-th background data codes for training.

17. The active learning device of claim 16, wherein the processor further performs:
(I2) (i) a process of cropping the object regions in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

18. The active learning device of claim 11, wherein, before the process of (I), the processor further performs:

(I3) (i) one of (i-1) (i-1-a) a process of inputting training images, sampled from a training image database to be used for training the object detector, into the object detector, to thereby allow the object detector to apply m times of the Monte Carlo dropouts to each of the training images and thus to generate first feature maps for training to m-th feature maps for training corresponding to each of the training images, (i-1-b) a process of applying the Bayesian output embedding operation to the first feature maps for training to the m-th feature maps for training, to thereby generate activation entropy maps for training, (i-1-c) a process of cropping one or more regions, corresponding to one or more objects for training, in each of the activation entropy maps for training, to thereby generate first cropped activation entropy maps for training to x-th cropped activation entropy maps for training wherein x is an integer equal to or greater than 1, and (i-1-d) a process of resizing (1) each of the activation entropy maps for training and (2) the first cropped activation entropy maps for training to the x-th cropped activation entropy maps for training corresponding to each of the activation entropy maps for training into a same size, to thereby generate first resized activation entropy maps for training to (x+1)-th resized activation entropy maps for training, and (i-2) (i-2-a) a process of inputting each of first resized object images for training to (x+1)-th resized object images for training, created by resizing each of the training images and cropped object images for training to a same size wherein the cropped object images for training are created by cropping one or more object regions in each of the training images, into the object detector, to thereby allow the object detector to apply m times of the Monte Carlo dropouts to each of the first resized object images for training to the (x+1)-th resized object images for training and thus to generate first object feature maps for training to m-th object feature maps for training corresponding to each of the first resized object images for training to the (x+1)-th resized object images for training, (i-2-b) a process of applying the Bayesian output embedding operation to the first object feature maps for training to the m-th object feature maps for training, to thereby generate the first resized activation entropy maps for training to the (x+1)-th resized activation entropy maps for training respectively corresponding to the first resized object images for training to the (x+1)-th resized object images for training, (ii) a process of inputting the first resized activation entropy maps for training to the (x+1)-th resized activation entropy maps for training into the model encoder of a model autoencoder, to thereby allow the model encoder to encode the first resized activation entropy maps for training to the (x+1)-th resized activation entropy maps for training and thus to output first model codes for training to (x+1)-th model codes for training corresponding to the first resized activation entropy maps for training to the (x+1)-th resized activation entropy maps for training, (iii) a process of inputting the first model codes for training to the (x+1)-th model codes for training into a model decoder of the model autoencoder, to thereby allow the model decoder to decode the first model codes for training to the (x+1)-th model codes for training and thus to output first reconstructed entropy maps for training to (x+1)-th reconstructed entropy maps for training, (iv) a process of training the model decoder and the model encoder using one or more first entropy losses to one or more (x+1)-th entropy losses calculated by referring to the first resized activation entropy maps for training to the (x+1)-th resized activation entropy maps for training and the first reconstructed entropy maps for training to the (x+1)-th reconstructed entropy maps for training.

19. The active learning device of claim 18, wherein the processor further performs:

(I4) (i) one of (i-1) (i-1-a) a process of inputting the evaluation images, sampled from the training image database, into the object detector, to thereby allow the object detector to apply m times of the Monte Carlo dropouts to each of the evaluation images and thus to generate first feature maps for evaluation to m-th feature maps for evaluation corresponding to each of the evaluation images, (i-1-b) a process of applying the Bayesian output embedding operation to the first feature maps for evaluation to the m-th feature maps for evaluation, to thereby generate activation entropy maps for evaluation, (i-1-c) a process of cropping one or more regions, corresponding to one or more objects for evaluation, in each of the activation entropy maps for evaluation, to thereby generate first cropped activation entropy maps for evaluation to y-th cropped activation entropy maps for evaluation wherein y is an integer equal to or greater than 1, and (i-1-d) a process of resizing (1) each of the activation entropy maps for evaluation and (2) the first cropped activation entropy maps for evaluation to the y-th cropped activation entropy maps for evaluation corresponding to each of the activation entropy maps for evaluation into a same size, to thereby generate first resized activation entropy maps for evaluation to (y+1)-th resized activation entropy maps for evaluation, and (i-2) (i-2-a) a process of inputting each of first resized object images for evaluation to (y+1)-th resized object images for evaluation, created by resizing each of the evaluation images and cropped object images for evaluation to a same size wherein the cropped object images for evaluation are created by cropping the object regions in the evaluation images, into the object detector, to thereby allow the object detector to apply m times of the Monte Carlo dropouts to each of the first resized object images for evaluation to the (y+1)-th resized object images for evaluation and thus to generate first object feature maps for evaluation to m-th object feature maps for evaluation corresponding to each of the first resized object images for evaluation to the (y+1)-th resized object images for evaluation, (i-2-b) a process of applying the Bayesian output embedding operation to the first object feature maps for evaluation to the m-th object feature maps for evaluation, to thereby generate the first resized activation entropy maps for evaluation to the (y+1)-th resized activation entropy maps for evaluation respectively corresponding to the first resized object images for evaluation to the (y+1)-th resized object images for evaluation, (ii) a process of inputting the first resized activation entropy maps for evaluation to the (y+1)-th resized activation entropy maps for evaluation into the model encoder of the model autoencoder, to thereby allow the model encoder to encode the first resized activation entropy maps for evaluation to the (y+1)-th resized activation entropy maps for evaluation and thus to output first model codes for evaluation to (y+1)-th model codes for evaluation corresponding to the first resized activation entropy maps for evaluation to the (y+1)-th resized activation entropy maps for evaluation, and (iii) a process of sorting the first model codes for evaluation to the (y+1)-th model codes for evaluation by the model codes and a process of generating the model codebook by referring to the average entropy values of the resized activation entropy maps corresponding to each of the model codes.

20. The active learning device of claim 19, wherein, each time the object detector is trained and re-trained, the processor performs or supports another device to perform a process of training the model encoder and a process of generating the model cookbook.

\* \* \* \* \*